US011341111B2

(12) United States Patent
Nakata et al.

(10) Patent No.: US 11,341,111 B2
(45) Date of Patent: May 24, 2022

(54) DATA PROCESSOR AND DATA PROCESSING METHOD

(71) Applicant: DENSO CORPORATION, Kariya (JP)

(72) Inventors: Tsuneo Nakata, Kariya (JP); Takaya Magatayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 584 days.

(21) Appl. No.: 15/792,319

(22) Filed: Oct. 24, 2017

(65) Prior Publication Data

US 2018/0113892 A1 Apr. 26, 2018

(30) Foreign Application Priority Data

Oct. 26, 2016 (JP) .................. 2016-209908
Aug. 10, 2017 (JP) .................. 2017-155375

(51) Int. Cl.
*G06F 16/22* (2019.01)
(52) U.S. Cl.
CPC .......... *G06F 16/2272* (2019.01); *G06F 16/22* (2019.01); *G06F 16/2282* (2019.01)
(58) Field of Classification Search
CPC ... G06F 16/22; G06F 16/2272; G06F 16/2282
See application file for complete search history.

(56) References Cited

U.S. PATENT DOCUMENTS

| 2006/0154692 | A1 | 7/2006 | Ikehara et al. |
| 2008/0215202 | A1* | 9/2008 | Breed ............. H04W 4/02 701/25 |
| 2014/0200019 | A1 | 7/2014 | Nishina |
| 2016/0057561 | A1* | 2/2016 | Kami ............. H04W 4/70 370/329 |
| 2017/0018190 | A1* | 1/2017 | Yamasaki ......... G08G 1/207 |
| 2017/0315683 | A1* | 11/2017 | Boucher .......... G06F 16/2228 |

FOREIGN PATENT DOCUMENTS

| JP | 2007-156752 A | 6/2007 |
| JP | 2013-143588 A | 6/2012 |
| JP | 2014-209311 A | 11/2014 |
| JP | 5692384 B2 | 4/2015 |
| JP | 2016-038715 A | 3/2016 |

* cited by examiner

*Primary Examiner* — Taelor Kim
(74) *Attorney, Agent, or Firm* — Maschoff Brennan

(57) ABSTRACT

A data processor for transferring or maintaining a data sample, includes: a table management unit that manages a data value table that relates a data type of the data sample, usage attribute information defined by a pair of at least one attribute type and a value concerning a utilization form, and information for defining a value index; and a prioritizing unit that defines the value index for the data sample based on the data value table, the value index belonging to a specific data type and associated with the usage attribute information, and sets a priority of the transferring or the maintaining of the data sample using the value index.

12 Claims, 23 Drawing Sheets

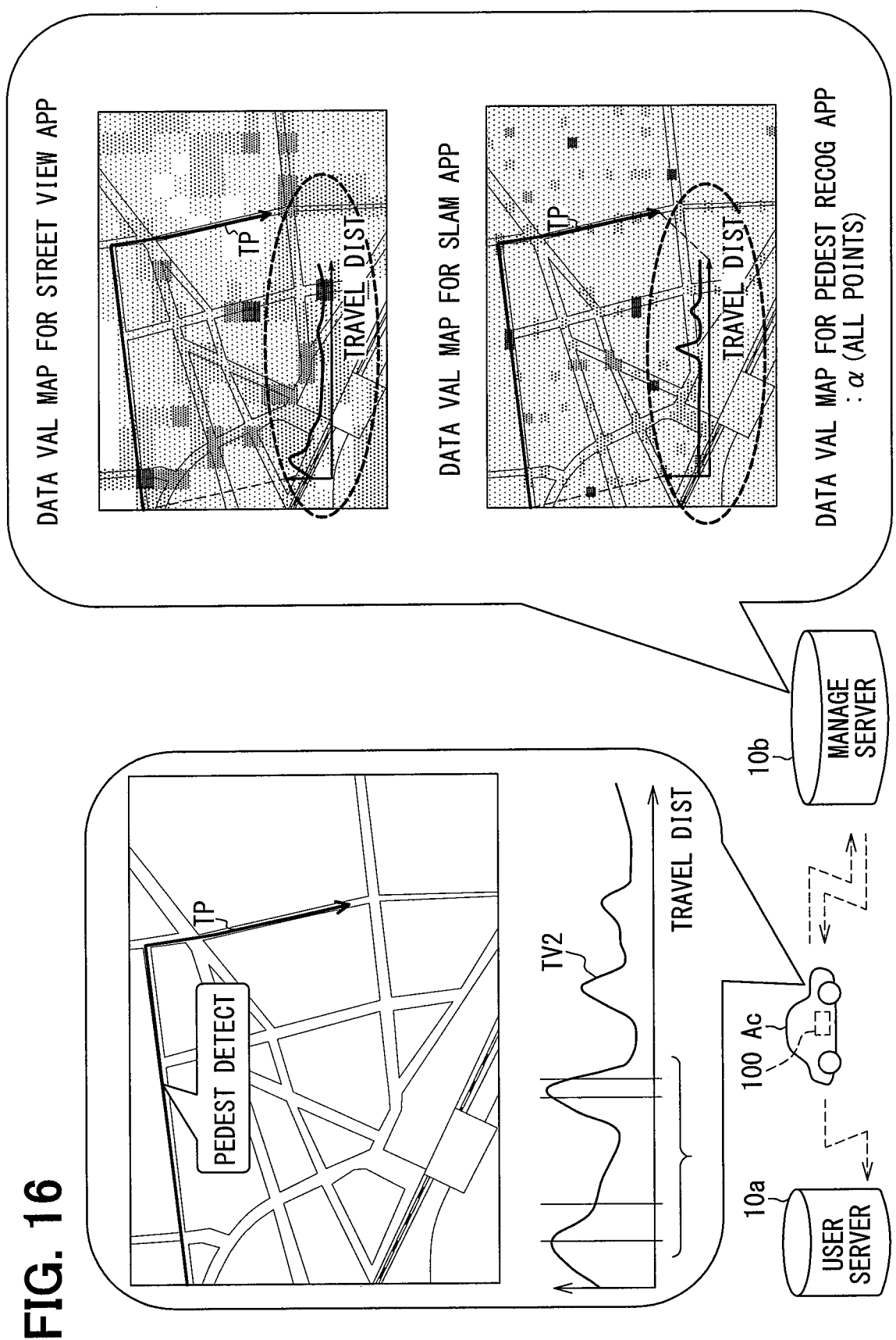

DATA PROCESSOR AND DATA PROCESSING METHOD

CROSS REFERENCE TO RELATED APPLICATIONS

This application is based on Japanese Patent Applications No. 2016-209908 filed on Oct. 26, 2016, and No. 2017-155375 filed on Aug. 10, 2017, the disclosures of which are incorporated herein by reference.

TECHNICAL FIELD

The present disclosure relates to a data processing technology that transfers or maintains data samples.

BACKGROUND

As a related art, patent literature 1 discloses a core network apparatus used for mobile communication systems as one type of apparatuses to transfer data. This core network apparatus transmits a usage promotion message that encourages a mobile terminal to use the communication when the subject apparatus decreases a resource utilization rate. As a result, it is possible to dynamically encourage a user to use the communication, increase the utilization rate, and optimize a resource utilization rate.

The technology disclosed in patent literature 1 can optimize the utilization rate of the resource but does not define the value of data to be transferred. If data processing uses a limited resource, even versatile and valuable data is likely to be excluded as a target to be transferred or saved because data priorities are not defined appropriately.

Patent Literature 1: Japanese Patent No. 5692384

SUMMARY

It is an object of the present disclosure to provide a data processor and a data processing method for maximizing a data value and efficiently using a data processing resource.

According to a first aspect of the present disclosure, a data processor for transferring or maintaining a data sample, includes: a table management unit that manages a data value table that relates a data type of the data sample, usage attribute information defined by a pair of at least one attribute type and a value concerning a utilization form, and information for defining a value index; and a prioritizing unit that defines the value index for the data sample based on the data value table, the value index belonging to a specific data type and associated with the usage attribute information, and sets a priority of the transferring or the maintaining of the data sample using the value index.

According to the above aspect, a data sample to be transferred or maintained uses a value index that is defined in accordance with a utilization form defined in the usage attribute information in the data value table. The defined value index is used to settle a priority of transferring or maintaining the data sample. As above, the priority of transferring or maintaining the data sample can be flexibly changed correspondingly to a variation of the utilization form if value indexes for respective data samples can be defined in consideration of the data utilization form, for example. The resource for data processing can be therefore efficiently used while maximizing data values.

According to a second aspect of the present disclosure, a data processor for transferring or maintaining a data sample, includes: a table management unit that manages a data value table including a data value map that defines and associates a value index with state information representing a state of a data processor, the value index being defined by a data type of the data sample; and a prioritizing unit that sets a priority of the transferring or the maintaining of the data sample belonging to a specific data type using the value index derived by applying the state information corresponding to acquisition of the data sample to the data value map.

According to the above aspect, a data sample to be transferred or maintained uses a value index that is defined in accordance with a utilization form defined in the usage attribute information in the data value table. The defined value index is used to settle a priority of transferring or maintaining the data sample. As above, the priority of transferring or maintaining the data sample can be flexibly changed correspondingly to a variation of the utilization form if value indexes for respective data samples can be defined in consideration of the data utilization form, for example. The resource for data processing can be therefore efficiently used while maximizing data values.

According to a third aspect of the present disclosure, a data processing method for transferring or maintaining a data sample is executed by at least one processing unit. The data processing method includes: referencing a data value table that relates a data type of the data sample, usage attribute information defined by a pair of at least one attribute type and a value concerning a utilization form, and information for defining a value index; defining the value index of the data sample based on the data value table, the value index belonging to a specific data type and associated with the usage attribute information; and settling a priority of the transferring or the maintaining of the data sample using the value index.

Also in the above aspect, a data sample to be transferred or maintained uses a value index that is defined in accordance with state information indicating a data processor state based on the data value map. The defined value index is used to settle a priority of transferring or maintaining the data sample. As above, the priority of transferring or maintaining the data sample can be flexibly changed correspondingly to a variation of the data processor state if value indexes for respective data samples can be defined in consideration of the data processor state, for example. The resource for data processing can be therefore efficiently used while maximizing data values.

According to a fourth aspect of the present disclosure, a data processing method for transferring or maintaining a data sample using a data processor is executed by at least one processing unit. The data processing method includes: referring a data value map for defining and associating a value index with state information representing a state of a data processor, the value index being defined by a data type of the data sample; deriving the value index of the data sample belonging to a specific data type by applying the state information corresponding to acquisition of the data sample to the data value map; and setting a priority of the transferring or the maintaining of the data sample using the value index.

Also in the above aspect, a data sample to be transferred or maintained uses a value index that is defined in accordance with state information indicating a data processor state based on the data value map. The defined value index is used to settle a priority of transferring or maintaining the data sample. As above, the priority of transferring or maintaining the data sample can be flexibly changed correspondingly to a variation of the data processor state if value indexes for respective data samples can be defined in consideration of the data processor state, for example. The resource for data processing can be therefore efficiently used while maximizing data values.

BRIEF DESCRIPTION OF THE DRAWINGS

The above and other objects, features and advantages of the present disclosure will become more apparent from the following detailed description made with reference to the accompanying drawings. In the drawings:

FIG. 16 is a diagram illustrating information acquired by a mobile terminal according to a fifth embodiment from a server;

DETAILED DESCRIPTION

Figure 1:
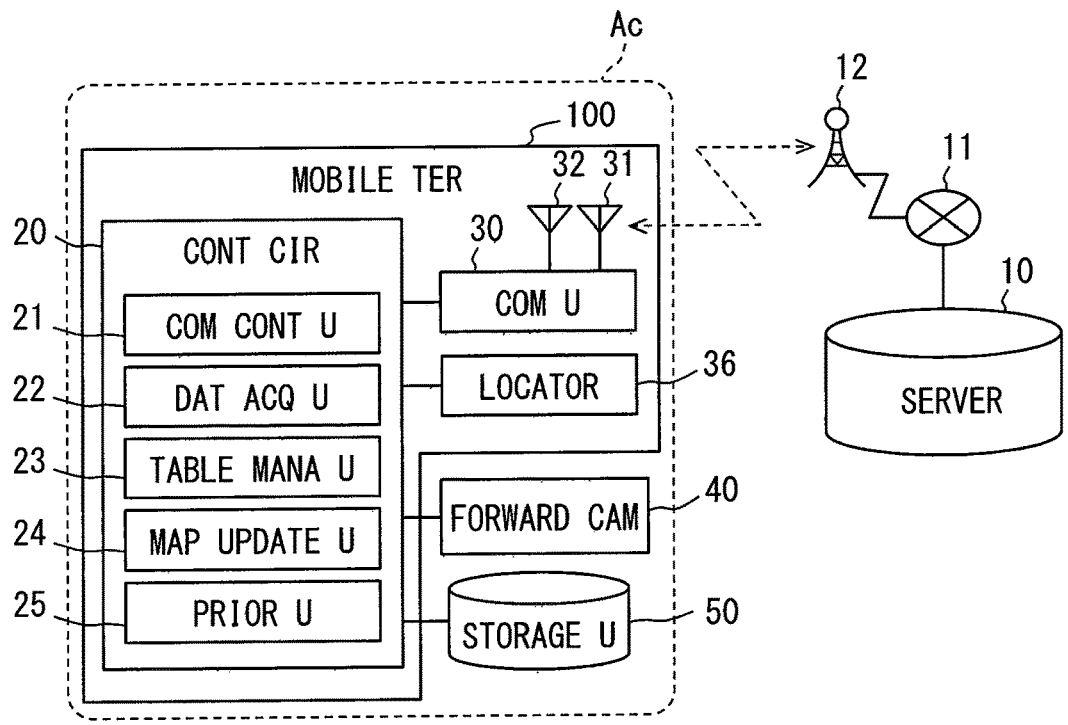
FIG. 1 is a block diagram illustrating an overall data processing system including a mobile terminal.

Embodiments of the present disclosure will be described in further detail with reference to the accompanying drawings. The same reference numerals may be used for the mutually corresponding elements in the embodiments to omit a duplicate description. A subsequent embodiment may describe only part of the configuration. In such a case, the other part of the configuration is applicable to the corresponding part of the configuration described in the preceding embodiment. Combinations of the configurations are not limited to those explicitly described in the embodiments. The configurations of the embodiments may be partially combined, even if not explicitly described, except an invalid combination. The description below will disclose an inexplicit combination of the configurations described in the embodiments and modifications.

First Embodiment

A mobile terminal 100 according to the first embodiment as illustrated in FIG. 1 is mounted on vehicle Ac and is movable with vehicle Ac. The mobile terminal 100 functions as a data processor that transfers or maintains various data samples acquired in vehicle Ac. The mobile terminal 100 can communicate with at least one server 10 installed at a data center via a base station 12 and the Internet 11.

The server 10 is provided as computing equipment installed outside vehicle Ac. The server 10 includes a large-capacity storage unit such as a hard disk drive. The server 10 is connected to the Internet 11, receives information such as data samples from each of mobile terminals 100 mounted on many vehicles Ac, and stores the received information in the storage unit. In addition, the server 10 transmits information such as a data value table (to be described) to the requesting mobile terminal 100 in response to a request to supply information from each mobile terminal 100.

The mobile terminal 100 is electrically connected to a forward camera 40 and a storage unit 50 mounted on vehicle Ac. The mobile terminal 100 includes a communication unit 30, a locator 36, and a control circuit 20.

The forward camera 40 is provided as capturing equipment that captures a forward field of vehicle Ac. The forward camera 40 captures an image (hereinafter referred to as a "forward image") in the forward field at a specified cycle to generate a forward field video. The forward camera 40 detects occurrence information about a specific event. An example of the event occurrence information represents that there is an object to be detected such as a pedestrian. Another example represents that the detected object is approached most closely. Image data for a forward image generated by the forward camera 40 is comparable to a data sample.

The storage unit 50 includes a storage medium such as flash memory or a hard disk drive. The storage unit 50 stores a data value table (to be described) in addition to a data sample such as a forward image. The mobile terminal 100 can read information stored in the storage unit 50. The storage unit 50 may be built in the mobile terminal 100 or may be provided as a memory card detachable from the mobile terminal 100.

The communication unit 30 includes a plurality of antennas 31 and 32 for wireless communication. The antenna 31 is used for mobile communication with the base station 12. The antenna 32 is used to transmit and receive information from an access point for wireless LAN, for example. The communication unit 30 can communicate with the server 10 via the base station 12 and the Internet 11 under control of the control circuit 20. The communication unit 30 can transfer a data sample generated by the forward camera 40 and an untransmitted data sample maintained in the storage unit 50 to the server 10. The communication unit 30 can receive a data value table stored in the server 10 from the server 10.

The locator 36 receives a positioning signal transmitted from a plurality of positioning satellites and positions a current position of the mobile terminal 100 by combining the positioning signal with a measurement result from an inertial sensor. The locator 36 measures a travel direction of vehicle Ac by combining a measurement signal with a measurement result from an electronic compass. The locator 36 supplies the control circuit 20 with position information including information about the travel direction along with map information around the corresponding vehicle Ac.

The control circuit 20 includes at least one processor, RAM, a rewritable nonvolatile storage medium, an input/output interface for information input/output, and a bus connecting these. The control circuit 20 includes a timer function and is capable of acquiring current time information. The storage medium is provided as flash memory, for example, and stores a data processing program that transfers or maintains data samples. The control circuit 20 allows the processor to execute the data processing program and thereby provides function blocks such as a communication control unit 21, a data acquisition unit 22, a table management unit 23, a map update unit 24, and a prioritizing unit 25.

The communication control unit 21 controls transfer of data samples from the communication unit 30 to the server 10. The communication control unit 21 requests the server 10 to supply information such as a necessary data value table and acquires information supplied from the server 10. The communication control unit 21 acquires information (hereinafter referred to as "communication state information") representing reception states of the antennas 31 and 32 and selects a communication resource used to transfer data from available communication resources.

The data acquisition unit 22 acquires the data sample such as a forward image, the occurrence information about an event such as pedestrian detection, and state information about the mobile terminal 100. The state information includes time information, current position information acquired from the locator 36, information representing a travel direction, information (circumference recognition state information) representing reliability of these, and transfer information representing the curvature of a road being traveled. The state information also includes communication state information about communication resources acquired from the communication unit 30 and position information representing detection range SA (see FIG. 3) of the forward camera 40. The data acquisition unit 22 can acquire information also from an in-vehicle network mounted on vehicle Ac or a communication path such as CAN (registered trademark). The data acquisition unit 22 can also acquire the state information available as speed information about vehicle Ac acquired from the in-vehicle network or information about an anomaly level of vehicle Ac such as sudden brake operation (see second modification).

The table management unit 23 manages and references the data value table stored in the storage unit 50. The table management unit 23 can read the data value table needed to calculate a value index for the acquired data sample from the storage unit 50. The data value table is related to a data type of the data sample, information capable of defining the value index, and usage attribute information.

The data type provides information representing the contents of respective data such as a forward image. The information capable of defining value indexes includes a data value map, a value correction map, a data transfer value map, and a communication resource map to be described later.

The usage attribute information is defined as a pair of a value and one or more attribute types corresponding to a utilization form. The attribute type includes an application, user identification information to use data, user classification, and the number of users. The application, one of attribute types, provides information representing the intended purpose of a data sample. The value paired with the application specifically provides each of a street view, pedestrian recognition, SLAM (Simultaneous Localization and Mapping), and detection algorithm training data.

A value paired with the user identification information can provide information representing each user using data samples, specifically, "vendor A," "vendor B," "individual C," "individual D," and so on. A value paired with the user classification can provide information representing the type or positioning of a user using data samples, specifically, "vendor," "individual," "platinum-level member," "gold-level member," "paid membership," and "free membership." A value paired with the number of users can provide numerical values such as "1," "2," and so on representing the number of actual users. The first embodiment provides only "application" as the attribute type of the usage attribute information.

The map update unit 24 updates information such as the data value map included in the data value table to the most recent contents. The map update unit 24 transmits a data value map update request to the server 10 at a predetermined timing. The communication control unit 21 communicates with the server 10 based on the request from the map update unit 24. In response to the request, the map update unit 24 rewrites the contents of the data value table by using the most recent information supplied from the server 10.

The prioritizing unit 25 provides specific usage attribute information and a priority of transfer or maintenance for each data sample that belongs to a specific data type and is associated with the above-mentioned usage attribute information. Suppose one data sample includes a plurality of usage attribute information items (e.g., applications). The prioritizing unit 25 defines a value index for each usage attribute information (application) based on the corresponding data value table. The prioritizing unit 25 specifies a data sample priority by using a plurality of value indexes defined for each usage attribute information (application), specifically, based on the sum of a plurality of value indexes defined for each application. Each of the defined value indexes provides a scalar quantity that can convert the value of a data sample into a monetary value.

For example, suppose there is provided a data value map corresponding to the application. The prioritizing unit 25 derives a value index for the data sample by applying the state information available to acquire the data sample to the data value map. The prioritizing unit 25 can derive a value index for the data sample based on the most recent data value map updated by the map update unit 24.

The prioritizing unit 25 transfers a data sample to the server 10 and stores the data sample in the storage unit 50 based on the settled priority. More specifically, a data sample is transferred first when the prioritizing unit 25 highly prioritizes the data sample out of a plurality of data samples to be transferred to the server 10. A data sample is deleted first from the storage unit 50 when the prioritizing unit 25 lowly prioritizes the data sample out of a plurality of data samples to be maintained in the storage unit 50.

Figure 2:
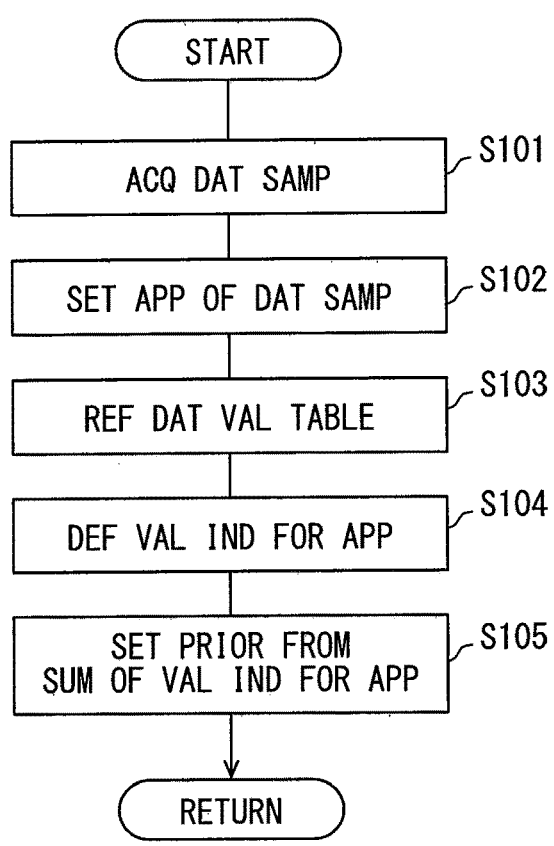
FIG. 2 is a flowchart illustrating in detail a priority specification process performed on a control circuit of the mobile terminal.

The description below explains in detail a data processing method performed by the control circuit 20 based on FIG. 2 with reference to FIG. 1. The control circuit 20 starts a priority specification process in FIG. 2 when vehicle Ac is ready for travel and the power supply to the mobile terminal 100 starts. The control circuit 20 repeatedly performs the control circuit 20 until the power supply to the mobile terminal 100 terminates. A user of vehicle Ac may turn on or off the priority specification process.

At S101, the process acquires a data sample and proceeds to S102. At S101, the process may successively acquire respective data samples one by one or may acquire a plurality of data samples at a time based on a predetermined cycle. At S102, the process settles the usage attribute information (such as an application, user classification, or the number of users) about the data sample acquired at S101 and proceeds to S103. The usage attribute information about the data sample may be comparable to an application entered by the user of the mobile terminal 100 or an application settled by a specified management organization. The contents of the usage attribute information associated with the data sample may be changed as needed. For example, the number of applications may be one or more. There may be provided a period during which no usage attribute information is settled.

At S103, the process references a data value table from the storage unit 50 under condition that the data value table is capable of defining a value index in the usage attribute information (application) settled at S102. The process then proceeds to S104. At S104, the process defines a value index for the data sample belonging to a specific data type (such as a forward image) based on the data value table. The process defines a value index for each application when a plurality of applications are defined at S102. The process then proceeds to S105.

At S105, the process settles a priority for the data sample from the sum of value indexes for each application defined at S104 and returns to S101. A process to transfer the data sample and a process to maintain the data sample are performed based on the priority settled at S105.

The description below explains in detail processes performed on data samples by the mobile terminal 100 by illustrating specific scenes. A scene explained by using FIGS. 3 through 5 to settle a priority to transfer a forward image to the server 10 and maintain the forward image in the storage unit 50 when the forward image is available for street view and pedestrian recognition.

Figure 3:
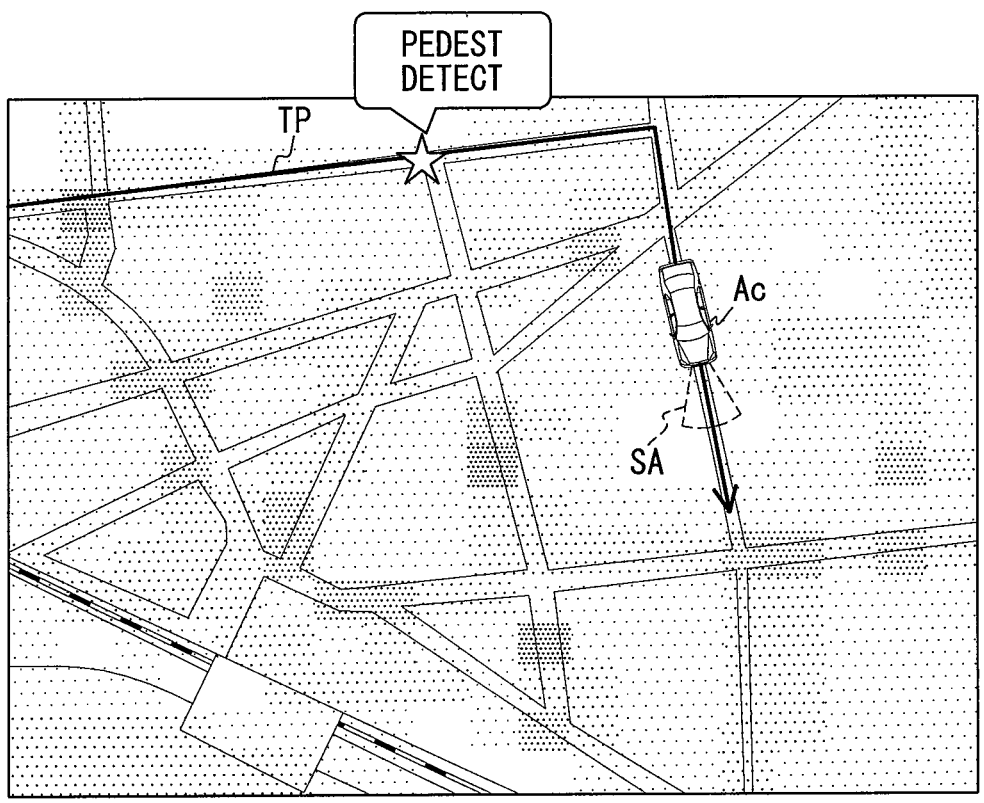
FIG. 3 is a diagram visualizing a data value map for street view application.

A data value map illustrated in FIG. 3 is capable of defining value indexes for a data sample in the street view application. The data value map is provided as information included in the data value table and is stored in the storage unit 50. The above-mentioned priority specification process allows the table management unit 23 to reference the data value map (see S103 in FIG. 2).

A value index in the data value map for the street view application corresponds to position information and time information as the state information about the mobile terminal 100. The value index is derived by applying the position information available to acquire the data sample to the data value map including the corresponding time information (see S104 in FIG. 2). The data value map allocates the value index to each rectangular grid-like field. The density of each field represents a high or low value index when the data value map is visualized.

The value index for each field in the data value map is settled based on the density of data samples transferred to the server 10 during a specified time period and based on the dispersion of the contents of information extracted from data samples, for example. Specifically, a large value index is derived when the field indicates a small number of samples (collection quantity) stored in the server 10 during a specified time period. A large value index is also derived from collected data samples when the field includes largely scattered information (large dispersion) such as luminance. A field containing dense dots in FIG. 3 represents insufficient data samples or large dispersion of data samples.

Figure 5:
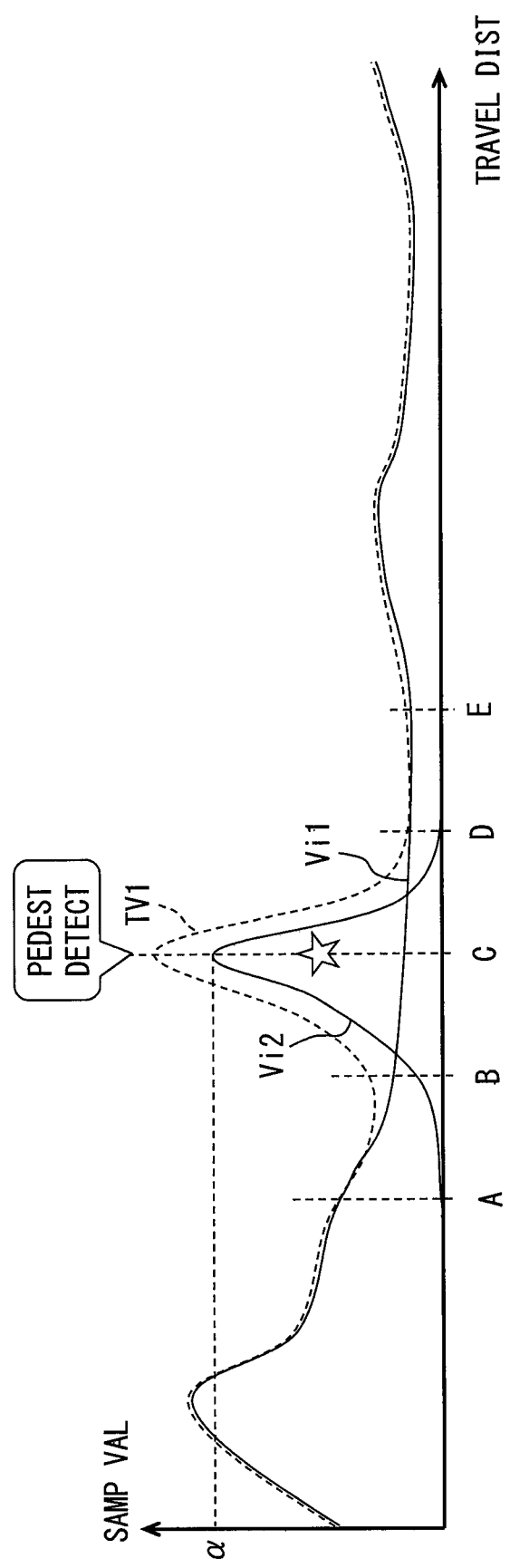
FIG. 5 is a diagram illustrating transition of value indexes for data samples according to a first embodiment.

Solid line Vi1 in FIG. 5 illustrates transition of a value index for the street view application defined in the mobile terminal 100 traveling along travel pathway TP when position information is applied to the above-mentioned data value map. The position information applied to the data value map may concern the mobile terminal 100 or specify detection range SA of the forward camera 40. When the position information about detection range SA is used, a data sample is associated with the largest value index out of value indexes related to a plurality of fields included in detection range SA. The data value map is settled for each time period and is updated to the contents corresponding to the current time as appropriate.

Another example is to define a value index for a data sample as a training data application that trains a detection algorithm. In this case, settlement of the value index for the training data application uses state information, namely, the circumference recognition state information representing reliability of the position information. The above-mentioned data value map defines a large value index for the forward image as a data sample when the measurement accuracy degrades due to a building shadow, for example. Matching for the map information using the forward image can estimate an approximately correct position of the mobile terminal 100. The data is useful to evaluate how accurately the position information is ensured, under an environment that hinders reception of satellite signals.

Figure 4:
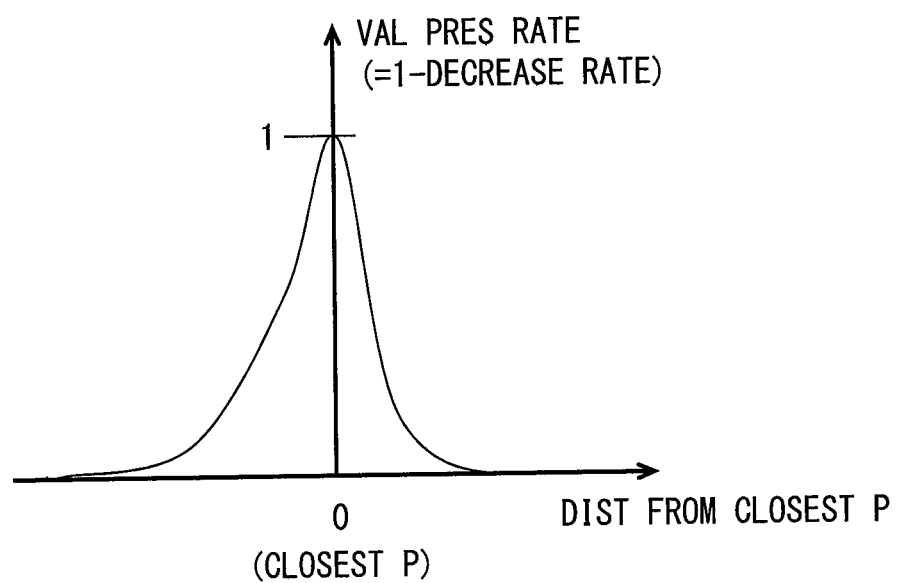
FIG. 4 is a diagram illustrating a value correction map for pedestrian recognition application.

The value correction map illustrated in FIG. 4 provides information capable of defining a value index for data samples in the pedestrian recognition application. The pedestrian recognition application uploads a forward image from the forward camera 40 to the server 10 for machine learning. The value index in the pedestrian recognition application does not vary with an absolute value of the mobile terminal 100, but varies with a difference in states with reference to occurrence of a specific event such as detection of a pedestrian, specifically, a time difference and/or a travel distance (positional difference). In other words, the data value map in the pedestrian recognition application provides predetermined value a regardless of positions of the mobile terminal 100. The "difference in states" of the mobile terminal 100 is used to settle a decrease rate in the value correction map, but is not limited to the time difference or the positional difference as above. The value correction map may use the "difference in states," namely, a difference in indexes representing states of the mobile terminal 100 as appropriate.

Specifically, the value correction map in the pedestrian recognition application uses a reference point (see "0" in FIG. 4) defined as a closest point to a detected specific target such as a pedestrian. A distance from the closest point to the pedestrian is associated with an increase-decrease rate (hereinafter referred to as a "value preservation rate") of the value index. The value preservation rate is found by subtracting the decrease rate of the value index from "1." The value preservation rate increases as the closest point is approached. The closest point indicates "1" (decrease rate=0). This signifies that the forward image includes the pedestrian at the highest resolution and the value of the data sample increases as a result. Passing through the closest point gradually decreases the value preservation rate that equals "0" at a predetermined distance or longer from the closest point. In other words, the decrease rate is set to "0" when the state (position) information corresponding to the data sample acquisition equals the state (position) information corresponding to the event detection. The decrease rate is set to "1" when the state information indicates a predetermined difference or larger.

An event to be detected is not limited to closest approximation to the detected target as above. An event the event detection unit can detect may be used as appropriate. The correspondence between the value preservation rate and the difference in states is not necessarily contiguous as above. The correspondence may be discontinuous when the pedestrian detection is assumed to be an event to be detected and the value preservation rate is set to "1" corresponding to detection of at least one pedestrian or is set to "0" corresponding to detection of no pedestrian, for example.

The value preservation rate is found by applying the position information about the closest point and the position information corresponding to acquisition of the data sample to the above-mentioned value correction map. The value index for data samples can be defined by multiplying the value preservation rate as a result of referencing the value correction map and predetermined value a together. As a result, solid line Vi2 in FIG. 5 represents transition of the value index that is used for the pedestrian recognition application and is defined by the mobile terminal 100 moving along travel pathway TP.

Priorities of data samples are settled based on the sum (broken line TV1) of: a value index (solid line Vi1) for the street view application based on the data value map; and a value index (solid line Vi2) for the pedestrian recognition application based on the value correction map. As a result, data samples acquired at spots A through E are assigned priorities in descending order of C>A>B>D>E. The data samples are therefore transferred to the server 10 in the order of C, A, B, D, and E when the communication with the server 10 is available. The data samples are discarded in the order of E, D, B, A, and C when the storage capacity of the storage unit is insufficient outside a communication area.

The first embodiment described so far defines the value index that is used for a data sample to be transferred or maintained and is compliant with a utilization form defined in the usage attribute information in the data value table. The defined value index is used to settle the priority of a data sample to be transferred or maintained. As above, the priority to transfer or maintain a data sample can be flexibly changed depending on a variation of utilization forms if value indexes for respective data samples can be defined in consideration of the utilization form of data.

More specifically, the data sample according to the first embodiment includes a plurality of applications each of which conforms to one of attribute types. In this case, the value index for each application is defined based on the data value table. A plurality of defined value indexes are used to settle the priority of a data sample to be transferred or maintained. As above, the priority to transfer or maintain data samples can be flexibly changed according as an application is added or removed if the value index for respective data samples can be defined for each application.

The data sample according to the first embodiment is further assigned the value index that is defined correspondingly to the state information representing the state of the mobile terminal 100 based on the data value map. The defined value index is used to settle the priority to transfer or maintain the data sample. As above, the priority to transfer or maintain data samples can be flexibly changed according as states of the mobile terminal 100 change if the value index for respective data samples can be defined in consideration of states of the mobile terminal 100.

Data processing resources such as a communication resource and a storage medium are therefore efficiently available so as to maximize data values.

In addition, the priority according to the first embodiment is settled for each usage attribute information, specifically, based on the sum of value indexes defined for the applications. The priority of a data sample corresponding to many applications is therefore sure to be settled high. Values of respective data samples can be therefore flexibly defined according to a change in the contents of the usage attribute information such as an increase or decrease of applications while ensuring the equitability among different applications.

The use of the data value map according to the first embodiment derives a value index corresponding to the state of the mobile terminal 100 when acquiring data samples. As above, the prioritizing unit 25 can appropriately define the value index for an application that varies with states of the mobile terminal 100.

The prioritizing unit 25 can correctly evaluate the priority of a data sample whose value varies with the acquisition position and the acquisition time when the position information and the time information are used as the state information representing the state of the mobile terminal 100. The priority of the data sample can be appropriately evaluated when circumference recognition state information is used as the state information about the data value map even if the value changes due to a variation in the measurement accuracy.

According to the first embodiment, the map update unit 24 performs the update as needed. The prioritizing unit 25 can therefore derive the value index for a data sample based on the up-to-date data value map. As above, the prioritizing unit 25 is appropriately available to even the value index for an application whose value index continually varies with a situation as to whether the collection quantity of data samples is sufficient.

According to the first embodiment, the data value map is updated to adjust and increase the value index for a field characterized by the insufficient density of data samples acquired in the server 10. Updating the value index allows the server 10 to preferentially collect data samples for the field that lacks for data samples.

According to the first embodiment, the data value map is updated to adjust and increase the value index for a field where the contents of acquired data samples are largely dispersed. Updating the value index as above can efficiently collect data samples for a field that requires more information than usual to ensure the accuracy.

The prioritizing unit 25 according to the first embodiment can moreover define the value index by using the value correction map for an application that increases or decreases the value depending on an event occurrence. In addition, the mobile terminal 100 can acquire the occurrence information about an event such as pedestrian detection. The prioritizing unit 25 can therefore appropriately evaluate the value index for data samples related to the event.

The value correction map according to the first embodiment defines the largest value index upon detection of an event occurrence and defines a smaller value index for data samples as the state of the event occurrence fades away. The use of this definition method can supply appropriate values to data samples correspondingly to an event whose value gradually attenuates from the occurrence time. Events furthermore include successful or unsuccessful detection of an object to be detected (such as a white line or a traffic sign) other than pedestrians and passage through the local maximum and minimum points for the detection reliability. Detection of these events can correctly define the value index for data samples in terms of a specific case (application) whose value (value index) is affected by the events.

The value index defined in the first embodiment is provided as a scalar quantity capable of converting a data sample value into a monetary value. This facilitates objective comparison between the value index for a data sample and costs to use the communication resource, for example. As above, it is possible to objectively evaluate whether transferring the data sample to the server 10 is sufficiently profitable.

In the first embodiment, the control circuit 20 corresponds to a "processing unit." The data acquisition unit 22 corresponds to an "event information acquisition unit." The communication unit 30 corresponds to a "transmission unit." The storage unit 50 corresponds to an "event detection unit." The mobile terminal 100 corresponds to a "data processor."

Second Embodiment

Figure 6:
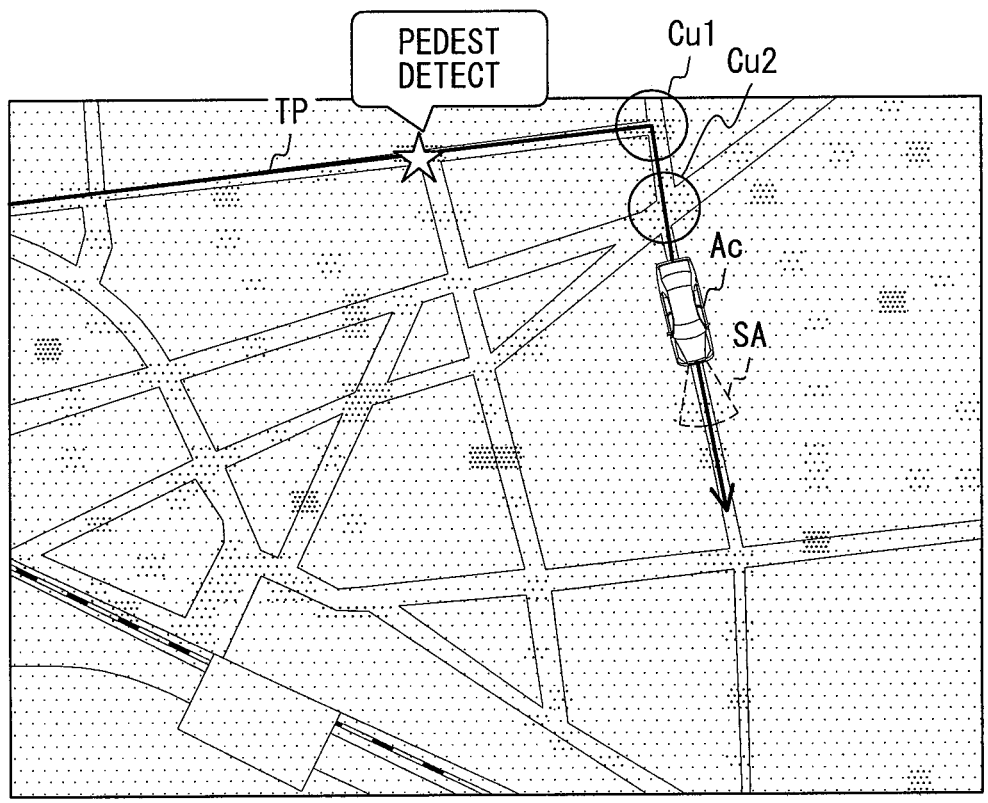
FIG. 6 is a diagram visualizing a data value map for SLAM application.
Figure 7:
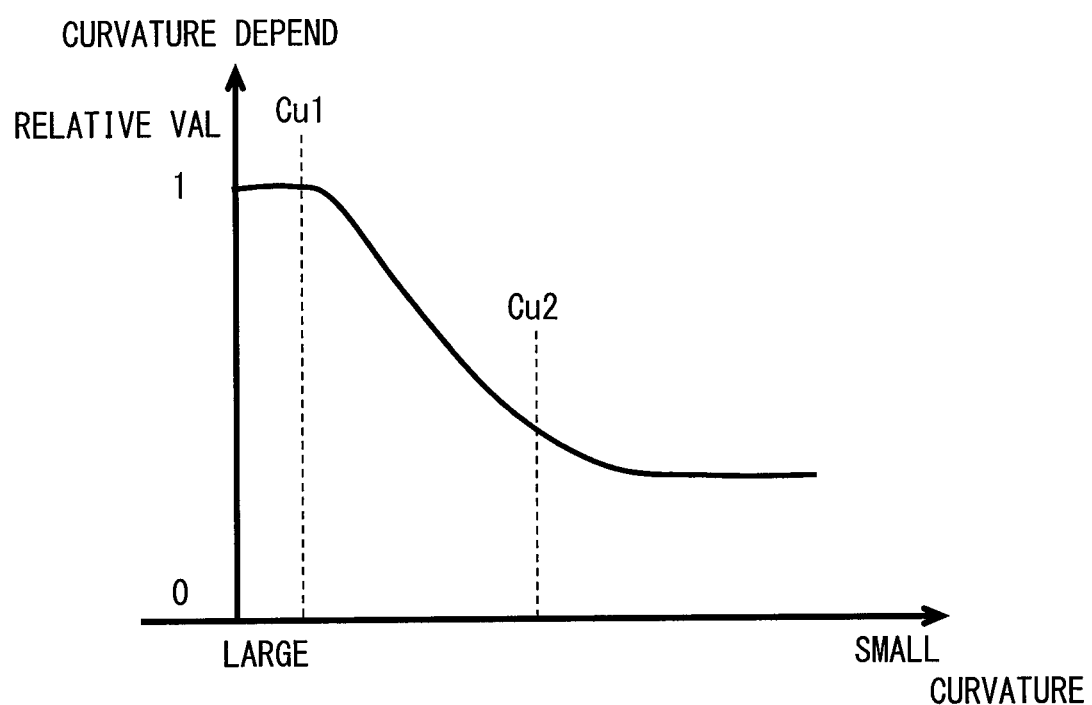
FIG. 7 is a diagram illustrating a value correction map for SLAM application.
Figure 8:
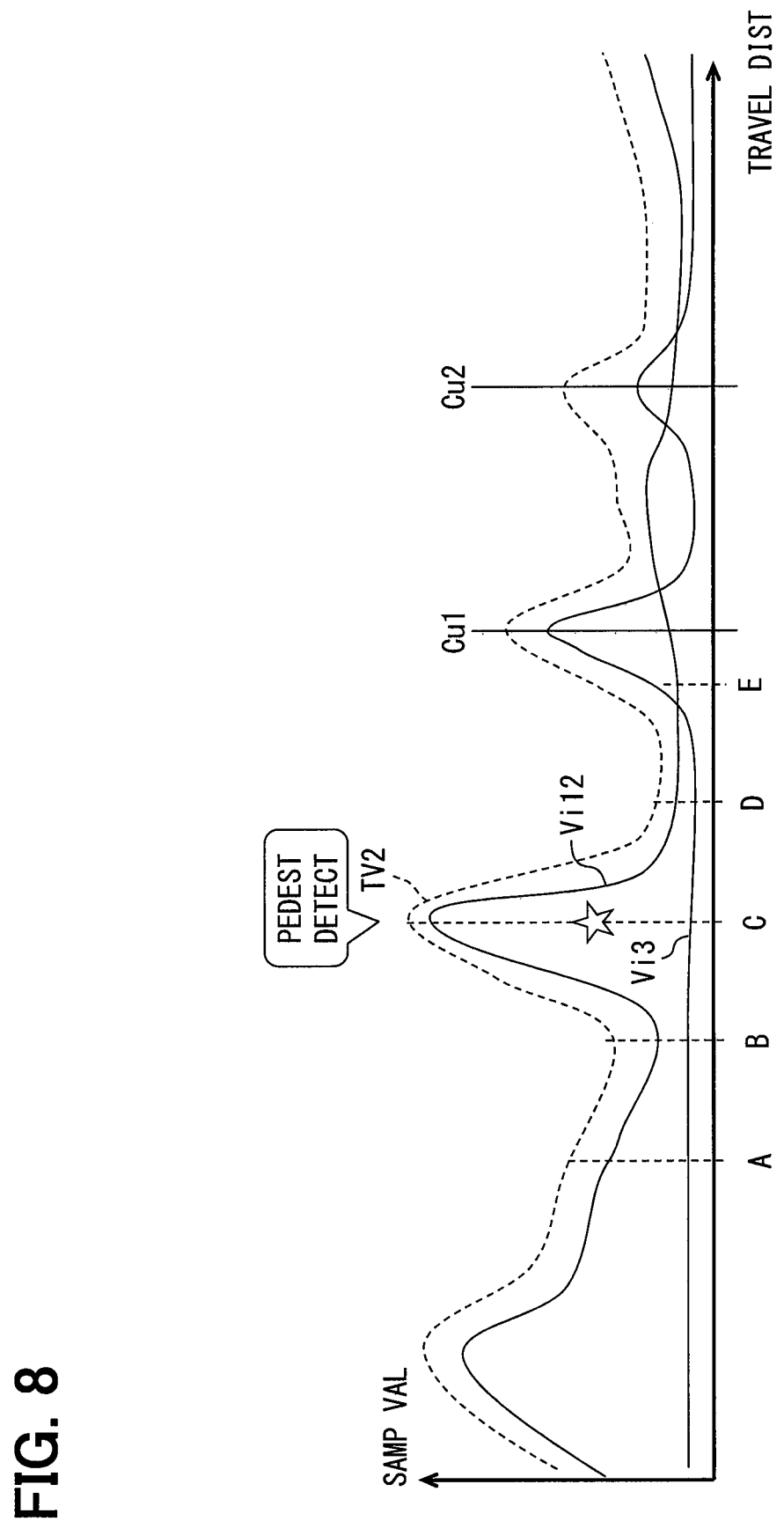
FIG. 8 is a diagram illustrating transition of value indexes for data samples according to a second embodiment.

The second embodiment as illustrated in FIGS. 6 through 8 adds an SLAM application as a data sample application in addition to the street view application and the pedestrian recognition application according to the first embodiment. The SLAM matches: the timing to detect right or left turning and curve traveling; and an intersection and a curve section on map data, and thereby corrects a position information error due to the locator 36 (see FIG. 1). The SLAM requires a travel including the curvature in order to ensure the map matching accuracy. The SLAM application therefore assigns a large value index to a data sample that is acquired at the curve with a large curvature.

The value correction map as illustrated in FIG. 7 provides information that can define a data sample value index in the SLAM application. As above, the value index in the SLAM application varies with a curve curvature, not an absolute position of the mobile terminal 100. The value correction map for the SLAM application therefore uses the curvature information about the curve used to acquire the data sample as the state information about the mobile terminal 100. The curve curvature information can be found from vehicle speed information and transverse acceleration information or steering angle information acquired from an onboard network, for example.

The value correction map associates the curve curvature information with the relative value of a data sample. The relative value is generally assumed to be "1" when a curve section with the curvature larger than specified is traveled. The relative value decreases to be smaller than "1" as the curve curvature decreases. For example, the relative value is set to "1" when vehicle Ac turns to the right (see Cu1). The relative value is set to "0.4" when vehicle Ac travels a gentle curve (see Cu2). The value index is defined in the SLAM application by applying the curve curvature information detected by vehicle Ac to the above-mentioned value correction map. As an example, solid line Vi3 in FIG. 8 illustrates transition of a value index in the SLAM application defined by the mobile terminal 100 that travels along travel pathway TP.

The priority of a data sample is settled based on the sum (broken line TV2) of: a total of value indexes (solid line Vi12) for the street view application and the pedestrian recognition application; and the value index (solid line Vi3) for the SLAM application based on the value correction map. As a result, the priorities of data samples acquired at spots A through E increase in the order of C>A>E>B>D differently from the first embodiment.

The data value map as illustrated in FIG. 6 instead of the above-mentioned value correction map may provide the information capable of defining data sample value indexes for the SLAM application. The data value map for the SLAM application provides value indexes associated with the position information. In FIG. 6, the more densely a field contains dots, the larger the value index is settled. Namely, a large value index is assigned to one of many fields that is included in the data value map and conforms to an intersection or a curve section. The use of this data value map can define the value index for the SLAM application based on the position information even when the curve curvature information cannot be acquired.

The second embodiment described so far provides the same effect as the first embodiment and settles a data sample priority corresponding to a plurality of applications predetermined for the data sample. It is therefore possible to efficiently use the communication resource and the data processing resource such as storage media while the data value is maximized.

In addition, the second embodiment uses the value correction map associated with the curvature information and the relative value of a curve to define the value index for the SLAM application that varies with the curve curvature. This technique properly evaluates the value index for data samples even if the application increases or decreases the value of a data sample in terms of traveling states of vehicle Ac.

Third Embodiment

The third embodiment illustrated in FIGS. 9 through 13 adds a remote monitoring application in automatic-operation hindering areas in addition to the street view application, the pedestrian recognition application, and the SLAM application described up to the second embodiment.

The real time property is requisite for a forward image acquired for the remote monitoring application. For example, the data sample value in the remote monitoring application drastically decreases (see the solid line in FIG. 9) when a transfer delay extends the time elapsed from the data acquisition. However, the street view application, the pedestrian recognition application, and the SLAM application require less real time property than the remote monitoring application. The value of a data sample is therefore maintained even when the time elapses from the acquisition of the data sample (see the broken line in FIG. 9).

Figure 9:
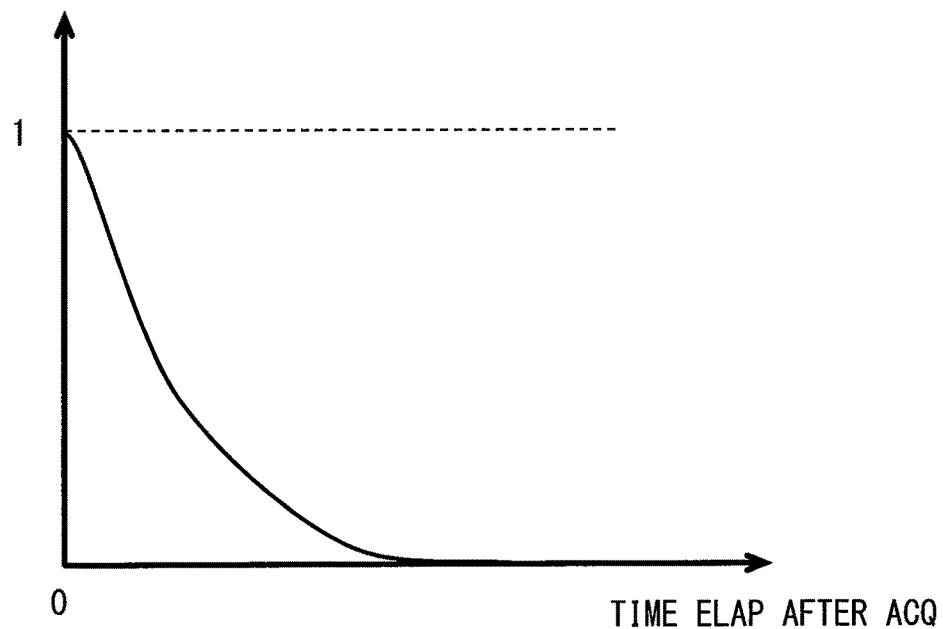
FIG. 9 is a diagram illustrating a delay correction map used to define value indexes for data samples in remote monitoring application.

The data sample value index for the remote monitoring application is found by multiplying sample value RV (see FIG. 10 as an example) as a reference and the value preservation rate corresponding to the elapsed time from the data acquisition. The delay correction map illustrated in FIG. 9 provides information capable of defining a data sample value index in the remote monitoring application and is used to derive a value preservation rate. The delay correction map associates the elapsed time after data sample acquisition with the value preservation rate for a data sample. Specifically, the delay correction map sets the value preservation rate to "1 (decrease rate=0)" at the time of data sample acquisition and sets the value preservation rate to "0 (decrease rate=1)" after a lapse of predetermined time or longer from the acquisition.

Figure 10:
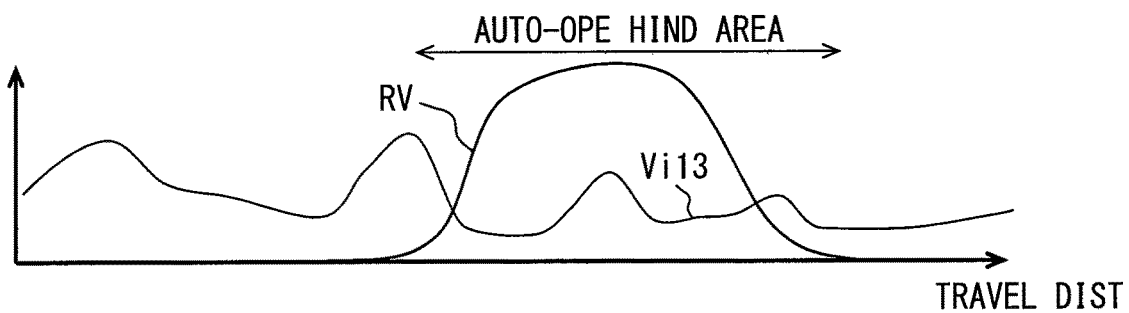
FIG. 10 is a diagram illustrating transition of value indexes for data samples according to a third embodiment.

FIG. 10 illustrates: sample value RV for the remote monitoring application defined in the mobile terminal 100 (see FIG. 1) traveling along travel pathway TP (see FIG. 6); and transition (solid line Vi13) of a total of value indexes other than the remote monitoring application. Sample value RV is assumed to be large in the automatic-operation hindering area. The value index in the remote monitoring application is found by multiplying sample value RV and a value preservation rate based on the value correction map.

Figure 11:
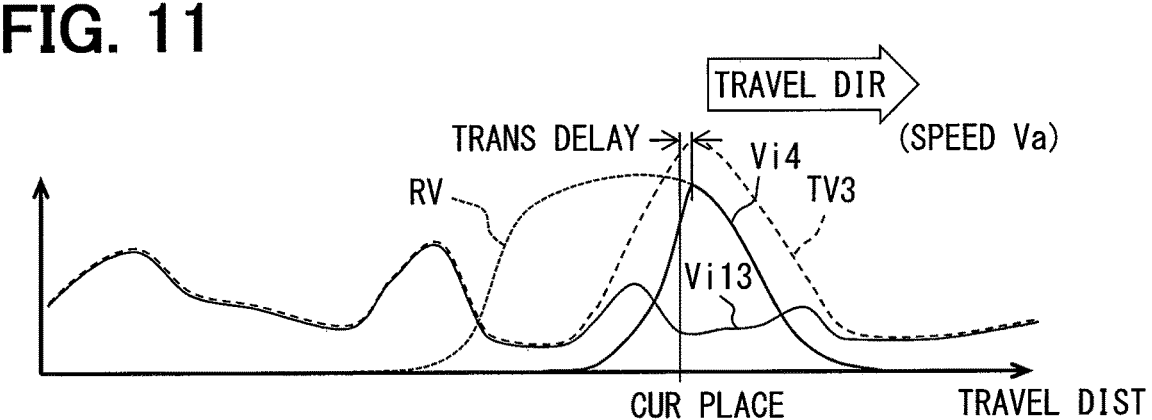
FIG. 11 is a diagram illustrating transition of value indexes for data samples.

FIG. 11 illustrates that a transfer delay occurs in data samples. In this case, the value index (solid line Vi4) in the remote monitoring application is smaller than sample value RV. The prioritizing unit 25 (see FIG. 1) settles priorities of respective data samples based on the sum (broken line TV3) of: the value index (solid line Vi4) in the remote monitoring application corrected by the value correction map; and a total of value indexes (solid line Vi13) other than the remote monitoring application.

As above, the value index in the remote monitoring application depends on the elapsed time after the data sample acquisition. Therefore, decreasing a travel speed of vehicle Ac (see FIG. 1) shortens a distance from the spot to acquire the data sample and the data sample value is lost in that distance.

Figure 12:
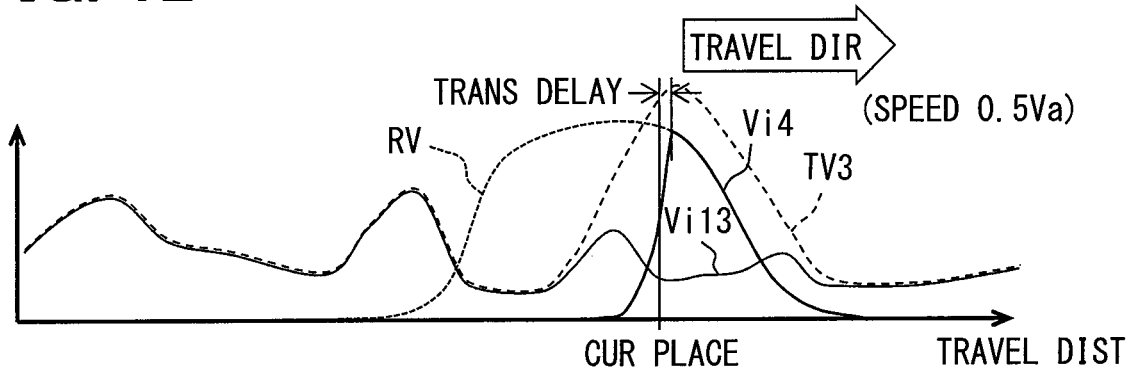
FIG. 12 is a diagram illustrating transition of value indexes for data samples.

In detail, FIGS. 11 and 12 illustrate value indexes after a lapse of time T1 from the data sample acquisition. The travel speed (0.5 Va) of vehicle Ac in FIG. 12 is half the travel speed (Va) of vehicle Ac in FIG. 11. The transition of two solid lines Vi4 makes it clear that the low travel speed causes attenuation in a short distance.

Figure 13:
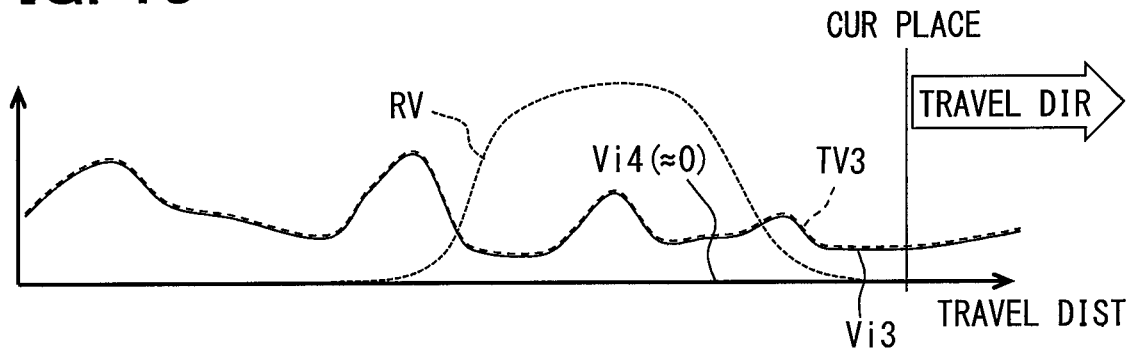
FIG. 13 is a diagram illustrating transition of value indexes for data samples.

FIG. 13 illustrates a value index in the remote monitoring application at time T2 (>T1) after passing through the automatic-operation hindering area. A predetermined time or longer elapses from the time to acquire a data sample. The value index in the remote handling application is substantially 0. The data sample value index therefore equals a total (solid line Vi13) of value indexes other than the remote handling application. In other words, the value index for the remote monitoring application hardly contributes to determination of data sample priorities.

The third embodiment also provides the effect similar to the first embodiment and efficiently uses data processing resources while maximizing data values. In addition, the third embodiment settles the increase-decrease rate (decrease rate) for the value index from the delay correction map associating the elapsed time after data sample acquisition with the value preservation rate and thereby appropriately defines a value index for the remote monitoring application that attenuates due to a transfer delay.

Fourth Embodiment

Similarly to the first embodiment, the fourth embodiment uses the street view application and the pedestrian recognition application to be data sample applications. Moreover, the fourth embodiment corrects the value index for each application based on the past achievement of transferring data samples.

Figure 14:
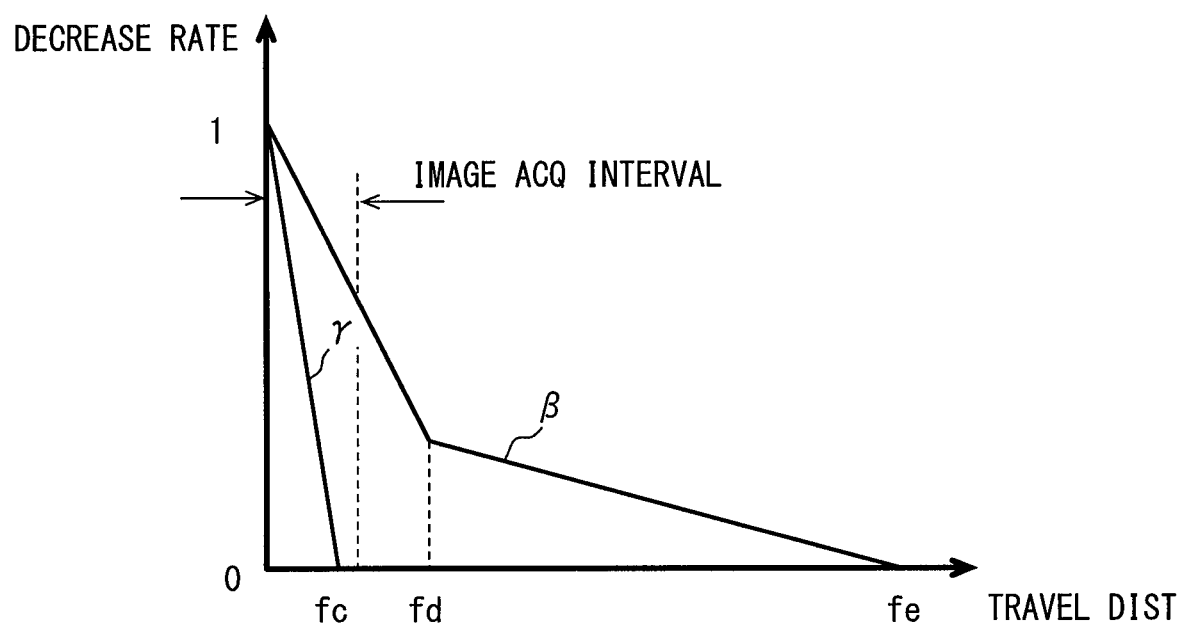
FIG. 14 is a diagram illustrating a value correction map to correct value index decrease due to a data sample transfer.
Figure 15A:
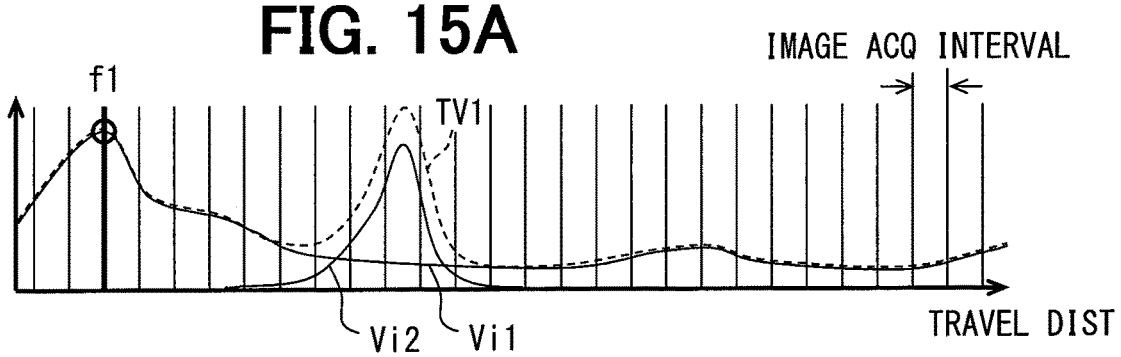
FIGS. 15A to 15D are diagrams illustrating transition of value indexes for data samples according to a fourth embodiment.
Figure 15B:
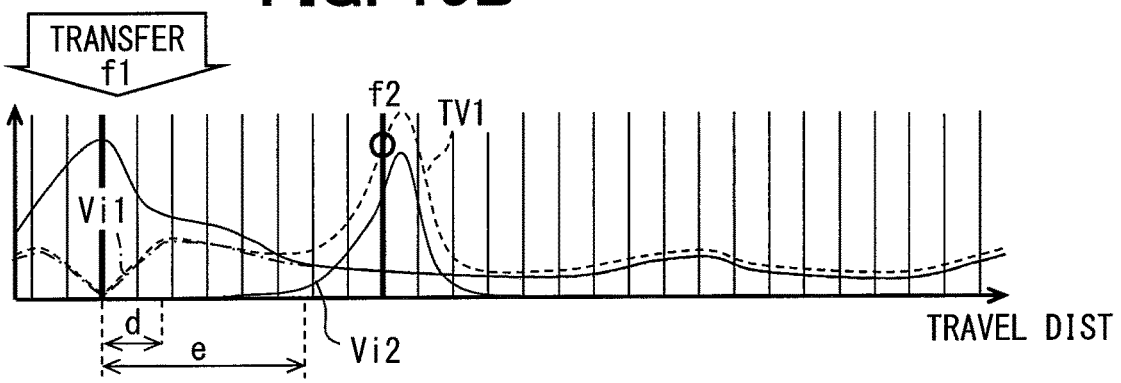
Figure 15C:
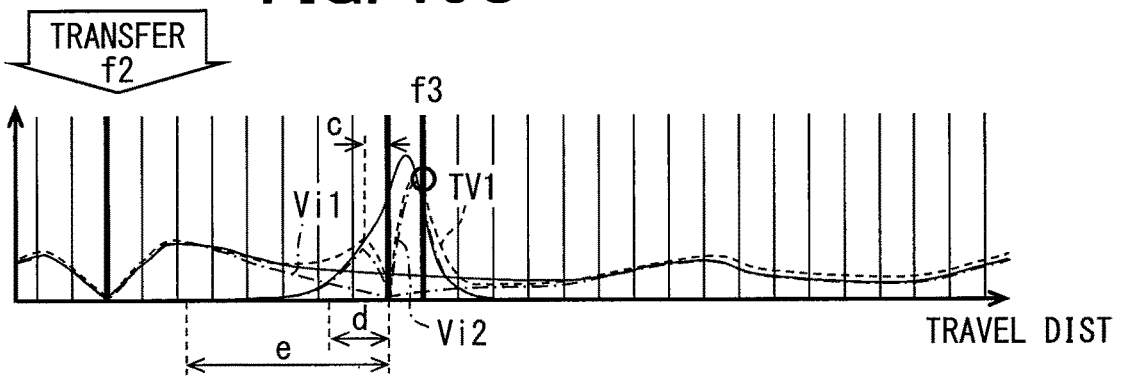
Figure 15D:
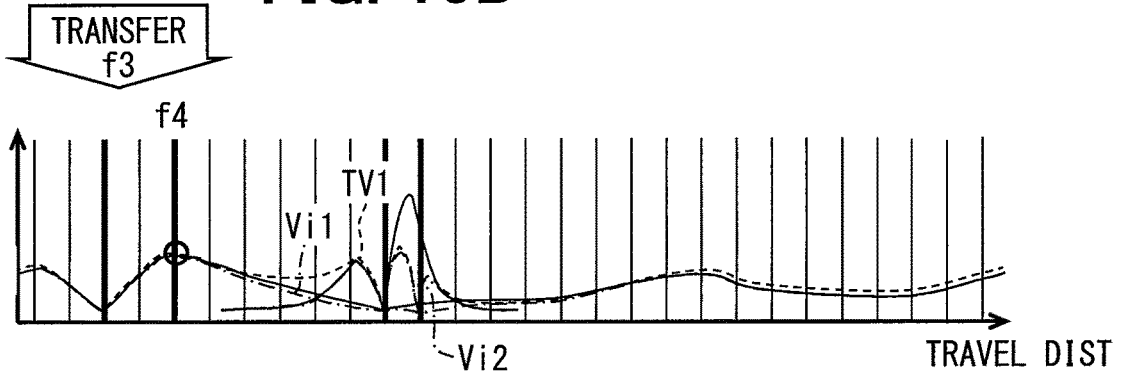

In detail, the street view application requires none of forward images captured at a predetermined image acquisition interval, for example. A forward image just needs to be acquired at an interval needed for each application. However, the application degrades the value of a forward image that is acquired before or after one forward image transferred to the server 10. The value correction map illustrated in FIG. 14 provides information assumes acquisition and transfer of a data sample to be an event and corrects degradation of the value index due to the event.

Specifically, the value correction map assumes the position of acquiring a transferred data sample to be a reference point and associates a travel distance from the reference point with a decrease rate of the value index. Decrease rates β and γ for each application each decrease as the travel distance from the reference point increases. Decrease rates β and γ for each application differ from each other in variations with a travel distance.

Decrease rate β for the street view application includes first intended acquisition cycle fd and second intended acquisition cycle fe. A decrease rate per unit travel distance decreases more largely in the section between the reference point and first intended acquisition cycle fd than in the section between first intended acquisition cycle fd and second intended acquisition cycle fe. Decrease rate β goes to "0" at second intended acquisition cycle fe.

Decrease rate γ for the pedestrian recognition application linearly decreases up to intended acquisition cycle fc. Intended acquisition cycle fc for the pedestrian recognition application approaches the reference point more closely than first intended acquisition cycle fd for the street view application. Moreover, intended acquisition cycle fc for the pedestrian recognition application is shorter than an image acquisition interval. The value index for the pedestrian recognition application is therefore narrower than the value index for the street view application in terms of a scope being influenced by a data transfer event.

The prioritizing unit 25 (see FIG. 1) applies the travel distance from the position to acquire a data sample, if transferred, to the value correction map and calculates decrease rates β and γ for the applications. Decrease rates β and γ are multiplied by transitions (Vi1 and Vi2) of the value indexes for the applications in FIGS. 15A to 15D before correction to define the value indexes for the transferred data samples.

In detail, the mobile terminal 100 transfers data sample f1 that is contained in many acquired data samples and indicates the largest sum (TV1) of the two value indexes. Decrease rate β based on the value correction map is multiplied by a range before and after the spot to acquire data sample f1 out of the transition (Vi1) of the value index for the street view application. The value index for the street view application decreases within a range from the spot to acquire data sample f1 to the second intended acquisition cycle fe (see the second drawing from the top in FIGS. 15A to 15D). The range to settle the value index for the pedestrian recognition application is distant from the spot to acquire data sample f1 by intended acquisition cycle fc or more. The transfer of data sample f1 therefore does not influence value indexes for the pedestrian recognition application.

The transfer of data sample f1 corrects the value index for the street view application. The mobile terminal 100 then transfers data sample f2 corresponding to the largest sum (TV1) of the corrected value indexes. As above, decrease rate β is multiplied by the range before and after the spot to acquire data sample f2 in the transition (Vi1) of the value index for the street view application. In addition, decrease rate γ is multiplied by the range before and after the spot to acquire data sample f2 in the transition (Vi2) of the value index for the pedestrian recognition application. As a result, the value index for the pedestrian recognition application decreases within the range between the spot to acquire data sample f2 and intended acquisition cycle fc (see the third drawing from the top in FIGS. 15A to 15D).

The transfer of data sample f2 corrects the value index for each application. The mobile terminal 100 then transfers data sample f3 corresponding to the largest sum (TV1) of the corrected value indexes. As above, decrease rates β and γ are multiplied by the range of the transition of each value index with reference to the spot to acquire data sample f3. As a result, data sample f4 is to be transferred next (see the drawing at the bottom in FIGS. 15A to 15D). As above, data sample f4 may decrease its value due to transfer of data sample f1 but is likely to be transferred after completion of transferring the other data samples.

The fourth embodiment also provides the effect similar to the first embodiment and efficiently uses data processing resources while maximizing data values. Moreover, the fourth embodiment uses the value correction map to calculate an appropriate value index for an application whose value is affected by transfer of a data sample. Furthermore, the fourth embodiment adjusts the length of the intended acquisition cycle for the value correction map on an application basis and thereby allows each application to be capable of appropriately settling a temporal or spatial range prone to the data sample transfer.

Fifth Embodiment

Similarly to the second embodiment, the fifth embodiment illustrated in FIG. 16 uses the street view application, the pedestrian recognition application, and the SLAM application as applications for data samples. Moreover, according to the fifth embodiment, the mobile terminal 100 can communicate with a management server 10b and acquires minimal information needed to define the value index for each application from the management server 10b. The management server 10b stores many data value tables so as to be deliverable. The fifth embodiment defines the server 10 (see FIG. 1), a destination of transferring data samples, as a user server 10a so as to be distinguished from the management server 10b.

The mobile terminal 100 can transmit the history or estimation of state changes in vehicle Ac to the management server 10b. Specifically, the mobile terminal 100 transmits travel pathway TP already traveled or scheduled for traveling to the management server 10b. Travel pathway TP may provide the travel history of the mobile terminal 100 or may provide an estimated travel pathway for the mobile terminal 100.

The management server 10b receives travel pathway TP from the mobile terminal 100 and transmits information to the mobile terminal 100 while the information is capable of defining the value index for each application in terms of a data sample that is acquired or is scheduled to be acquired along travel pathway TP. Specifically, the management server 10b extracts a range of the data value map related to travel pathway TP and transmits the range to the mobile terminal 100. The management server 10b can extract the range related to travel pathway TP from each data value map for the street view application and the SLAM application and can supply the range to the mobile terminal 100.

The table management unit 23 (see FIG. 1) of the mobile terminal 100 acquires the information from the management server 10b while the information includes the data value table capable of defining the value index for each data sample. The prioritizing unit 25 (see FIG. 1) settles the sum (TV2) of value indexes and priorities for many untransmitted data samples based on each data value map received from the management server 10b. The method of settling priorities substantially equals the method described in the second embodiment. Data samples are sequentially transferred to the user server 10a from the highly prioritized data samples.

The fifth embodiment described so far provides the effect similar to the first embodiment. Moreover, according to the fifth embodiment, the data value map around travel pathway TP is extracted by the management server 10b and is supplied to the mobile terminal 100. According to this technique, the mobile terminal 100 need not use an unneeded data value map. It is therefore possible to save the storage capacity of the storage unit 50 (see FIG. 1). Furthermore, the data value map transmitted to the mobile terminal 100 is limited to the vicinity of travel pathway TP. A downstream band can be therefore conserved.

The above-mentioned fifth embodiment transmits travel pathway TP as achievement or estimation to the management server 10b. The mobile terminal 100 may transmit the position information about current vehicle Ac instead of travel pathway TP to the management server 10b. Based on the received position information, the management server 10b extracts a specified range from the data value map for each application with reference to the current position of the mobile terminal 100 and transmits the range to the mobile terminal 100. As a result, the table management unit 23 can acquire the data value table capable of defining the value index for a data sample acquired within the specified range. The above-mentioned modification limits information, if transmitted from the mobile terminal 100 to the management server 10b, to the position information. An upstream band can be therefore conserved.

Similarly to the data value map, the value correction map for the pedestrian recognition application may be available as information supplied from the management server 10b. When detecting an event, the mobile terminal 100 requests the management server 10b to supply the value correction map related to the detected event. According to this modification, the mobile terminal 100 acquires only the value correction map related to only events vehicle Ac can detect. It is therefore possible to conserve a downstream band and the capacity of the storage unit 50.

Sixth Embodiment

Figure 17:
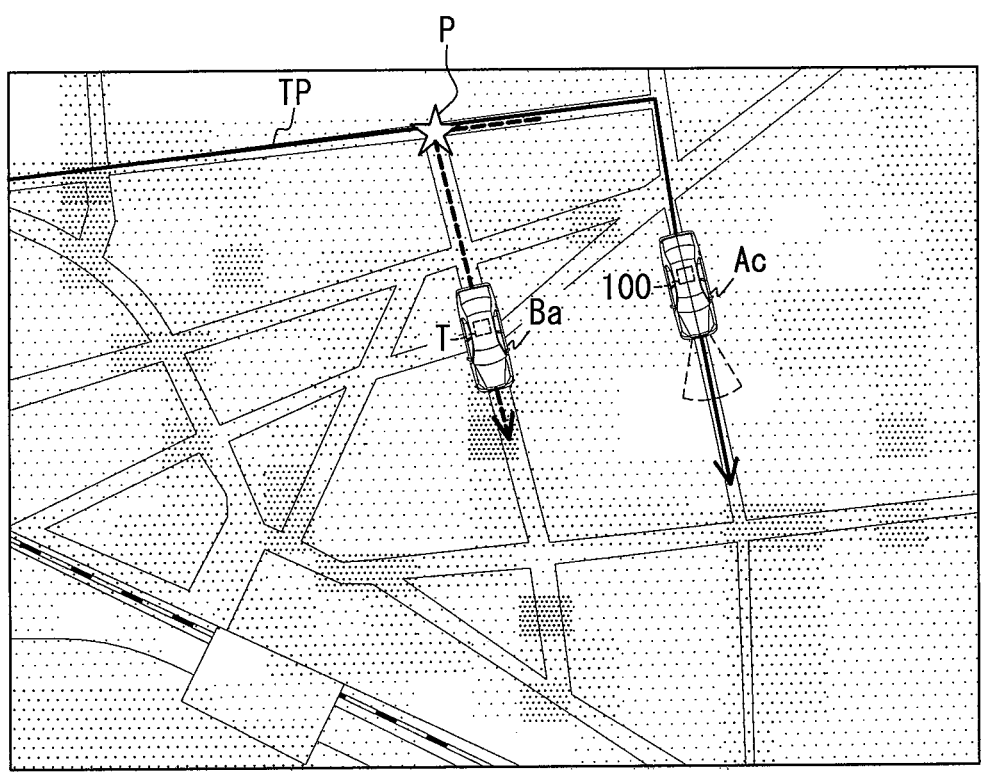
FIG. 17 is a diagram visualizing a data value map for street view application.
Figure 18:
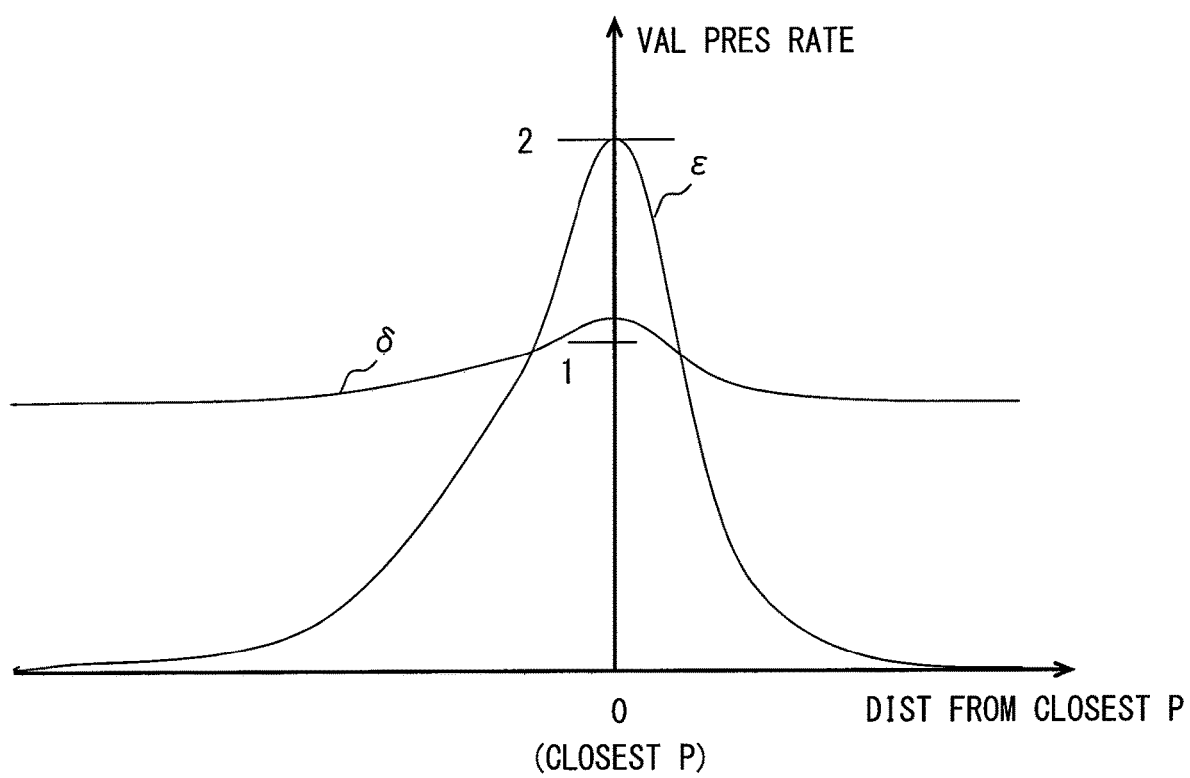
FIG. 18 is a diagram illustrating a value correction map pedestrian recognition application.
Figure 19:
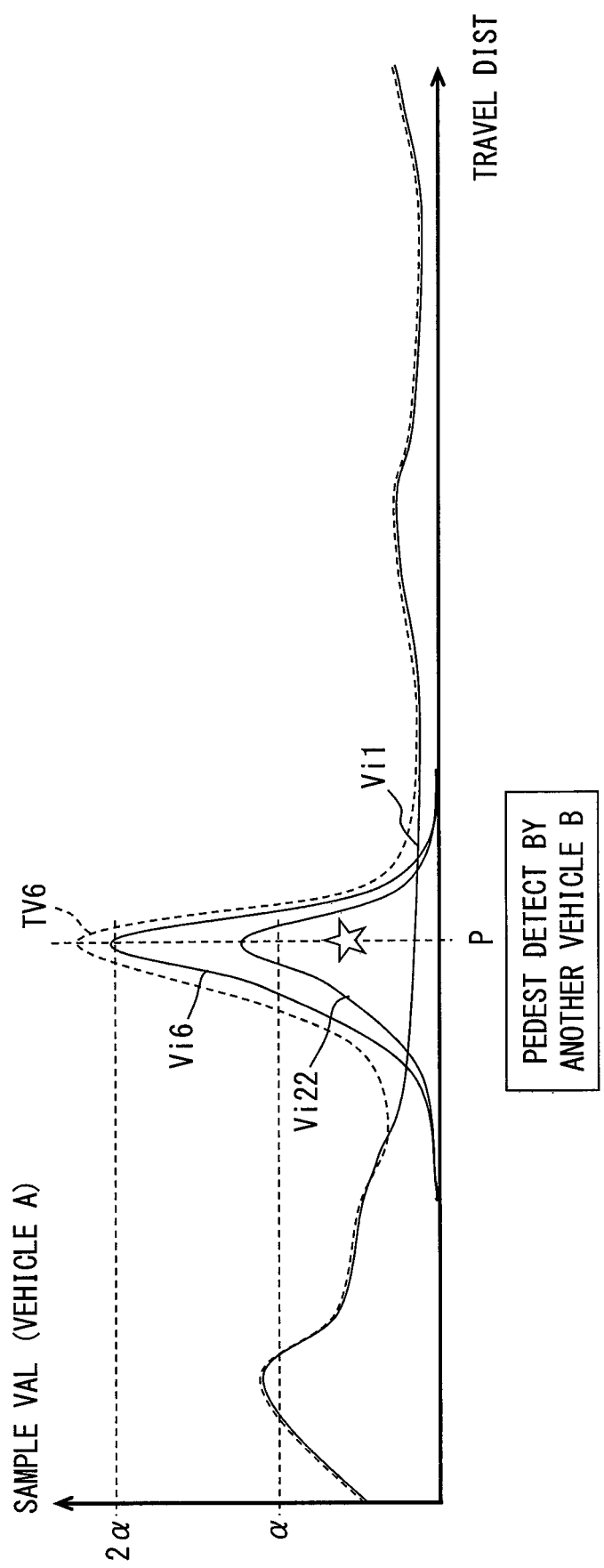
FIG. 19 is a diagram illustrating transition of value indexes for data samples according to a sixth embodiment.

Similarly to the first embodiment, the sixth embodiment illustrated in FIGS. 17 through 19 uses the street view application and the pedestrian recognition application as applications for data samples. In addition, the mobile terminal 100 according to the sixth embodiment acquires information about an event detected by another vehicle Ba, combines the acquired information with a data value correction map, and thereby settles the priority for each data sample. The sixth embodiment describes vehicle Ac as "subject vehicle Ac" to be distinguished from other vehicle Ba. A mobile terminal mounted on vehicle Ac will be described as "subject terminal 100." A mobile terminal mounted on other vehicle Ba will be described as "other terminal T."

Similarly to the subject terminal 100, other terminal T acquires occurrence information about an event such as pedestrian detection based on the information detected by an autonomous sensor such as the forward camera. Other terminal T transmits the acquired occurrence information to the server 10 (see FIG. 1) as well as the position information and the time information representing the place and the time of the event occurrence.

The mobile terminal 100 illustrated in FIGS. 1 and 17 can allow the communication unit 30 and the communication control unit 21 to communicate with the server 10 and thereby acquire the occurrence information about an event acquired at other terminal T. As above, the data acquisition unit 22 acquires the occurrence information (hereinafter referred to as "subject terminal information") about the pedestrian detection acquired by the mobile terminal 100 and the occurrence information (hereinafter referred to as "other terminal information") about the pedestrian detection acquired by other terminal T.

The prioritizing unit 25 corrects the data sample value index by using the subject terminal information and the other terminal information. The prioritizing unit 25 compares the subject terminal information with the other terminal information and extracts a difference between the subject terminal information and the other terminal information in terms of event detection results. The prioritizing unit 25 defines the value index for a data sample related to an event causing a difference in the detection results so that the value index is larger than that of an event causing no difference in the detection results.

The "difference found" in the above-mentioned context signifies that a field simultaneously belongs to visual fields of cameras for the subject terminal and the other terminal and only one of the terminals detects a target in the field. Alternatively, the state of the difference is considered impossible if detection results from both terminals are true. For example, the terminals simultaneously detect a target at the same time but the estimated target positions differ from each other so as to satisfy a positioning error or larger. Alternatively, the terminals differ in the number of targets or types.

A data sample is defined as being high under the condition of "difference found" as above because the data sample can be uploaded to the server and can be used for human eyes or a high-end server to determine whether the detection fails, or to notify an alarm. As another reason, the value is expected to be high compared to a case where there is no difference in contribution to the improvement of the detection capability through the use of machine learning.

Specifically, the prioritizing unit 25 defines value indexes by using a value correction map (hereinafter referred to as a "second correction map") based on comparison between the subject terminal information and the other terminal information illustrated in FIG. 18 in addition to the value correction map (hereinafter referred to as "first correction map," see FIG. 4) described in the second embodiment. The prioritizing unit 25 multiplies the data value map for the pedestrian recognition application indicating predetermined value a by the first correction map and the second correction map to derive a value index for data samples in the pedestrian recognition application.

Similarly to the first correction map, the second correction map maintains correspondence between a distance from the closest point most approximate to a pedestrian and a value preservation rate of the value index. The second correction map includes correlation line δ and correlation line ε. Correlation line δ specifies a value preservation rate at which the mobile terminal 100 and other terminal T can detect the same target. Correlation line ε specifies a value preservation rate at which the mobile terminal 100 and other terminal T cannot detect the same target. The value preservation rate based on correlation line δ is set to a value approximate to "1." The value preservation rate based on correlation line ε is set to "2" at the closest point, gradually decreases correspondingly to an increase in the distance from the closest point, and is set to "0" at a predetermined distance or longer from the closest point. The above-mentioned second correction map allows a difference between other terminal T and the mobile terminal 100 in terms of event detection results to be used as a parameter that varies the value index for data samples.

FIG. 19 illustrates transition of data sample value indexes defined in the subject terminal 100 that travels along travel pathway TP (see FIG. 17). Suppose other vehicle Ba detects a pedestrian at a given spot P illustrated in FIGS. 17 and 19. Subject vehicle Ac may detect the same pedestrian detected by other vehicle Ba. In this case, the transition of the value index (solid line Vi22) in the pedestrian recognition application almost equals the second embodiment (solid line Vi2 in FIG. 5).

Subject vehicle Ac may not detect the same pedestrian detected by other vehicle Ba. In this case, the value index in the pedestrian recognition application is approximately doubled (solid line Vi6) in comparison with the case of successful detection of the same pedestrian at spot P where the pedestrian is detected. In this case, the prioritizing unit 25 (see FIG. 1) defines priorities of respective data samples based on the sum (broken line TV6) of the value index corresponding to the unsuccessful detection of the same pedestrian and the value index (solid line Vi1) in the street view application.

The sixth embodiment described so far provides the effect similar to the first embodiment. Moreover, the sixth embodiment can acquire the other terminal information acquired by other terminal T and corrects a data sample value variation due to an influence of the other terminal information. As above, the prioritizing unit 25 can correctly define the data sample value index even for an application whose value varies with a difference in event detections.

Seventh Embodiment

According to the seventh embodiment illustrated in FIGS. 20 through 27B, the mobile terminal 100 maintains a communication resource map related to the communication resource. The mobile terminal 100 uses the communication resource map to generate a schedule to transfer a data sample in accordance with the communication resource situation. The communication resource map maintains correspondence between the information about the communication resource used for the data sample transfer and the state information (such as the position information) representing the state of the mobile terminal 100.

The prioritizing unit 25 (see FIG. 1) can select a communication resource used to transfer the data sample as a transfer target based on the communication resource map. Moreover, the prioritizing unit 25 compares the value index per data quantity (such as a bit) with the cost of using the communication resource per data quantity in terms of the communication resource available to transfer the data sample. The prioritizing unit 25 selects the data sample as a transfer target to be transferred by using the communication resource when the data sample causes a difference or a ratio between the value index per data quantity and the usage cost to be larger than or equal to a threshold value.

The communication unit 30 (see FIG. 1) is capable of wireless communications such as: LTE, namely, the wireless communication using communication lines compliant with the Long Term Evolution (LTE) cellular system; and WiFi, namely, the wireless communication compliant with the WiFi (registered trademark) standard. The storage unit 50 (see FIG. 1) of the mobile terminal 100 stores a plurality of communication resource maps generated for these communication resources. Information related to the communication resource includes information representing availability or unavailability of the communication resource, information about the available capacity of the communication resource, information representing a communication band during the use of the resource, information representing a communication delay during the use of the resource, and information representing a communication loss during the use of the resource. Especially, the information about the LTE communication resource includes information representing the number of terminals that currently use a specified base station.

Figure 20:
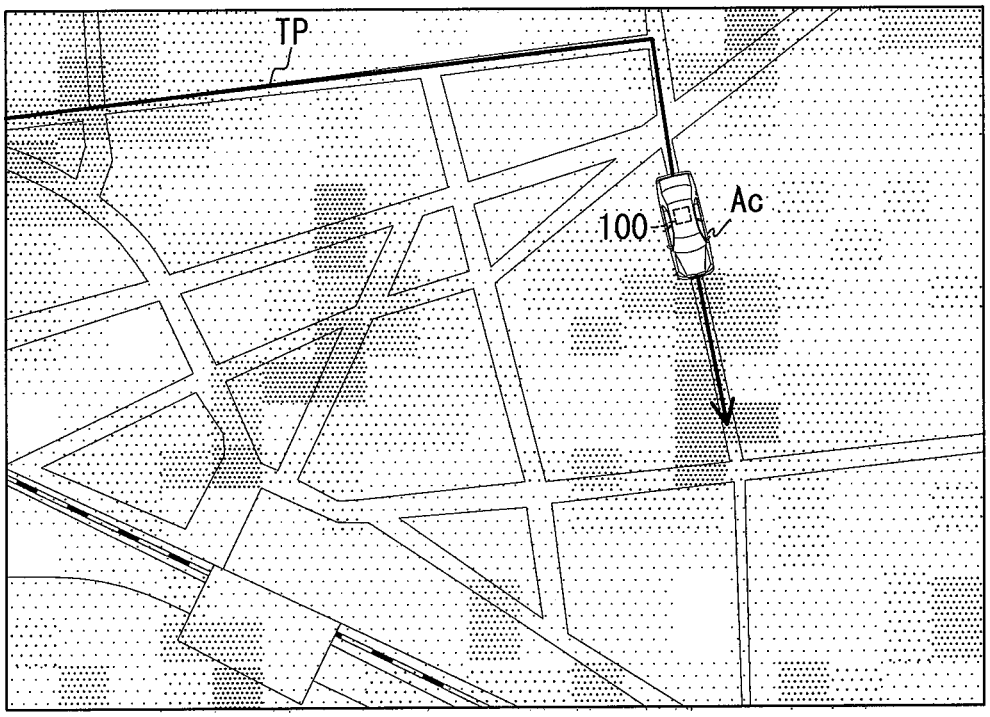
FIG. 20 is a diagram visualizing an LTE communication resource map.

The communication resource map illustrated in FIG. 20 associates the information representing LTE bandwidths available for transfer of data samples with the position information of the mobile terminal 100. The communication resource map for LTE allocates an available bandwidth to each rectangular grid-like field. The dot density of each field represents a bandwidth when the communication resource map is visualized. The more densely a field contains dots, the wider the LTE bandwidth value index is settled. The dot density of each field may represent information about the above-mentioned other communication resources such as a delay duration and susceptibility to a loss.

Figure 21:
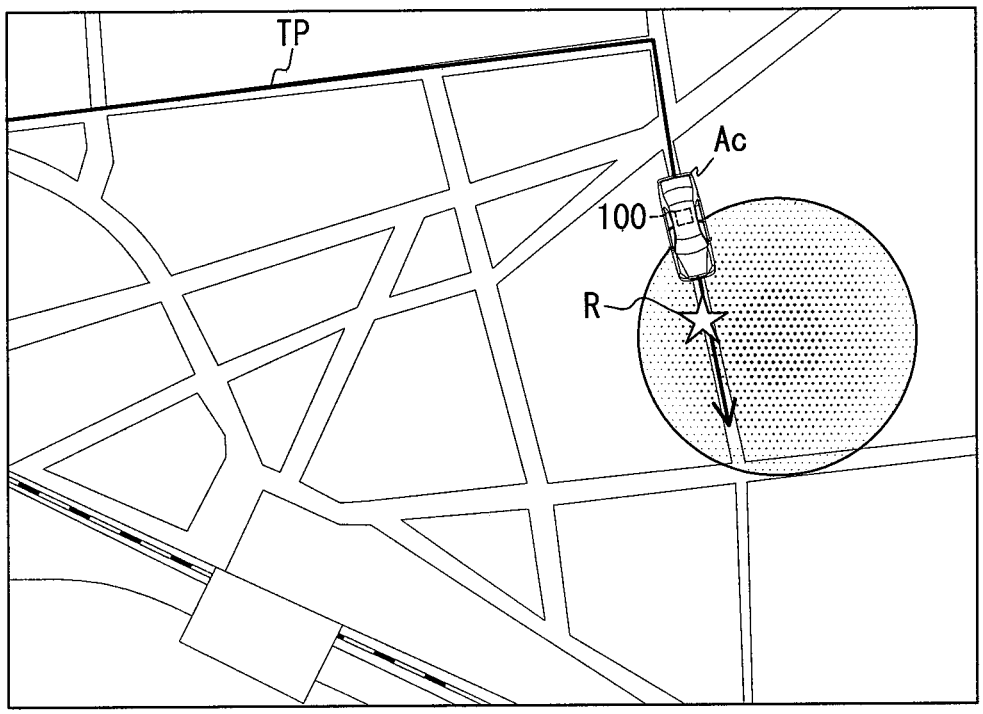
FIG. 21 is a diagram visualizing a WiFi communication resource map.

The communication resource map illustrated in FIG. 21 associates the information representing the WiFi bandwidth available for data sample transfer and the state of being inside or outside a communication area with the position information of the mobile terminal 100. The communication resource map for WiFi may provide information simply representing a communication area inside which the WiFi communication is available.

Figure 22A:
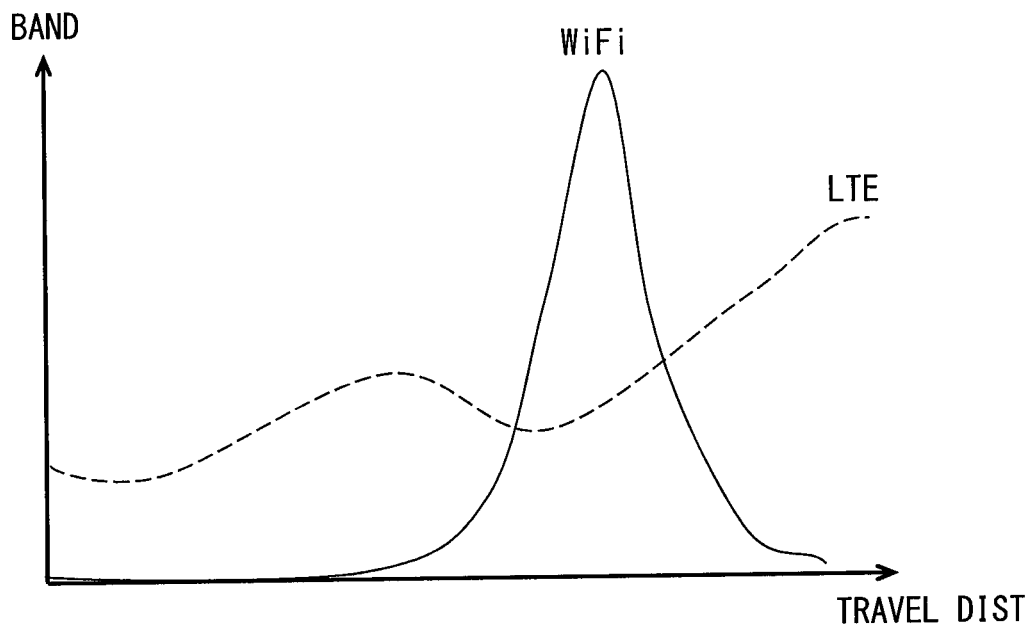
FIGS. 22A to 22B are diagrams illustrating bandwidths and communication costs per bit of communication resources used for a travel pathway.
Figure 22B:
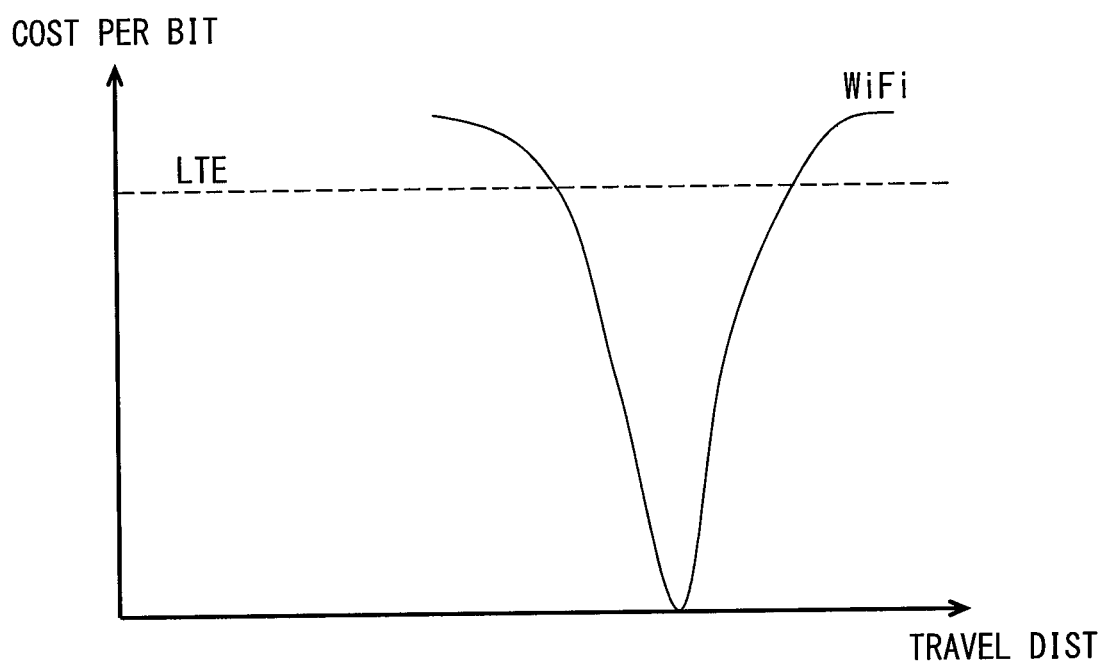

In addition, the information about the communication resource includes information about utilization costs of the communication resource. The information about utilization costs includes contract information about a provider of the communication resource and information representing the efficiency of resource utilization. The information about utilization costs is provided as a utilization cost map, for example. As an example, suppose the mobile terminal 100 travels along travel pathway TP illustrated FIGS. 20 and 21. In this case, the band for each communication resource and costs per bit transition as illustrated in FIGS. 22A to 22B based on the communication resource map and the utilization cost map.

The LTE communication cost per bit (broken line) complies with a transfer unit price extracted based on the contract information. According to the example, the communication cost is constant regardless of positions of the mobile terminal 100. Contrastingly, the WiFi communication cost per bit (solid line) is estimated to be low in a wide band that causes heavy traffic per hour on the assumption that the WiFi maintenance cost per hour is constant.

Figure 23:
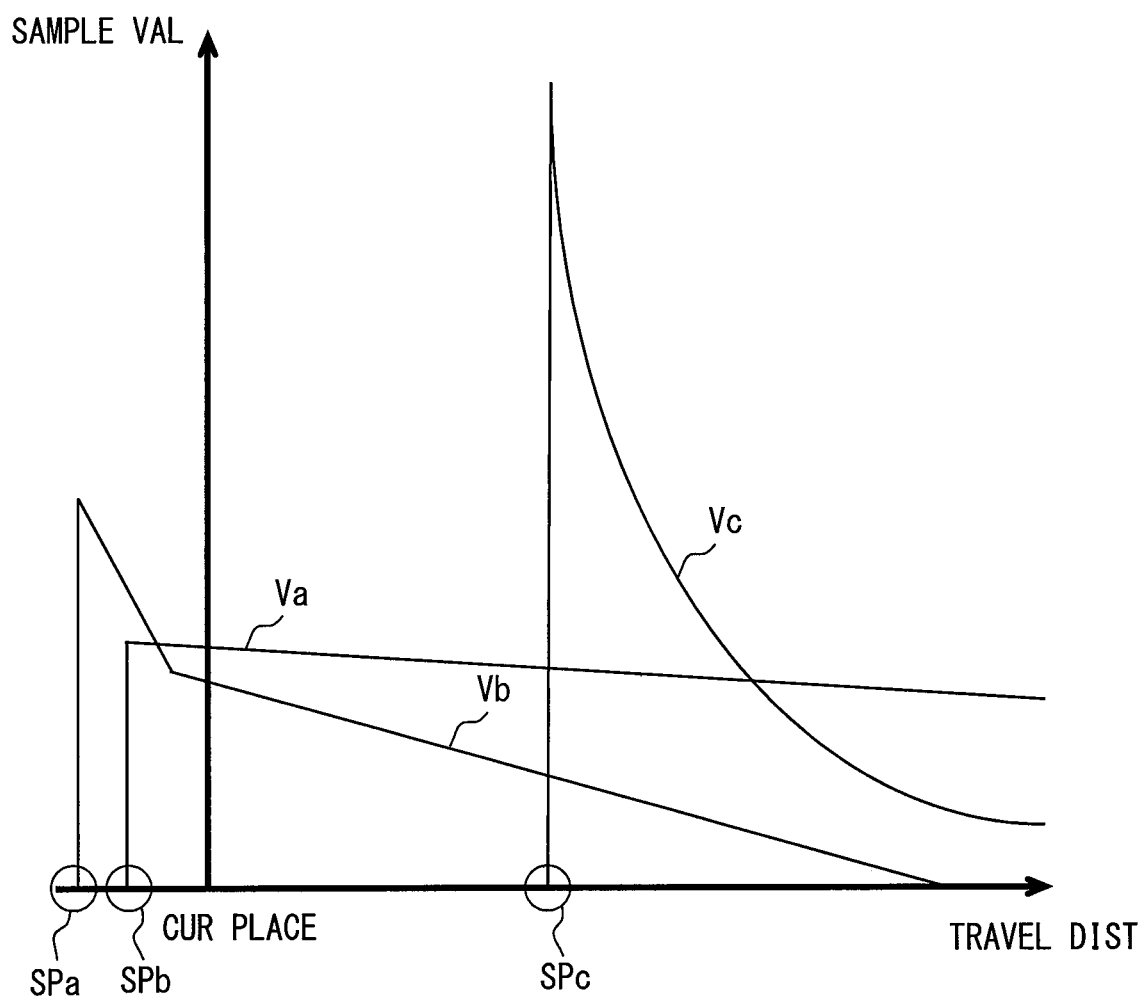
FIG. 23 is a diagram illustrating correlation between a mobile terminal position and a value of each data sample.

The description below explains in detail a plurality of transfer schedules generated by using the communication resource map and the utilization cost map with reference to FIG. 1. The mobile terminal 100 travels along travel pathway TP and acquires a request for fixed point monitoring at spot R to be traveled in the future. The mobile terminal 100 acquires data samples including biological sensor information about a user, vehicle control information such as a vehicle speed, and a forward image. As illustrated in FIG. 23, values of the data samples gradually decrease in accordance with an increase in distances from acquisition points SPa through SPb where the data samples are acquired. FIG. 23 illustrates transition of value Va of the biological sensor information, value Vb of the vehicle control information, and value Vc of the forward image as a fixed point monitoring video. The description below assumes that the data samples use the same data quantity.

<Transfer Schedule 1>

Figure 24A:
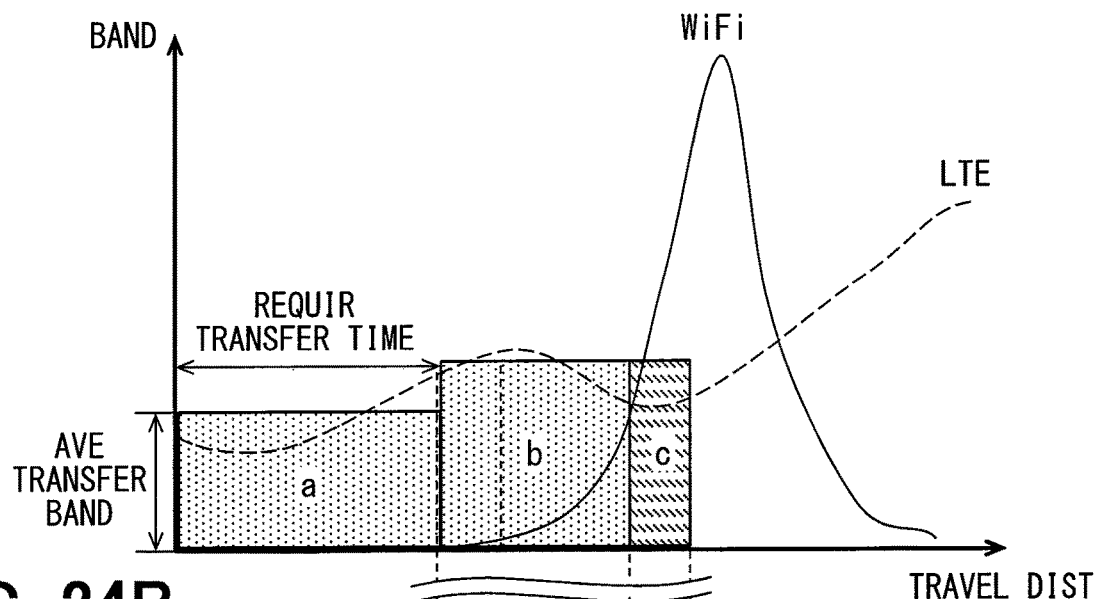
FIGS. 24A to 24B are detailed diagrams illustrating transfer schedule 1 according to a seventh embodiment.
Figure 24B:
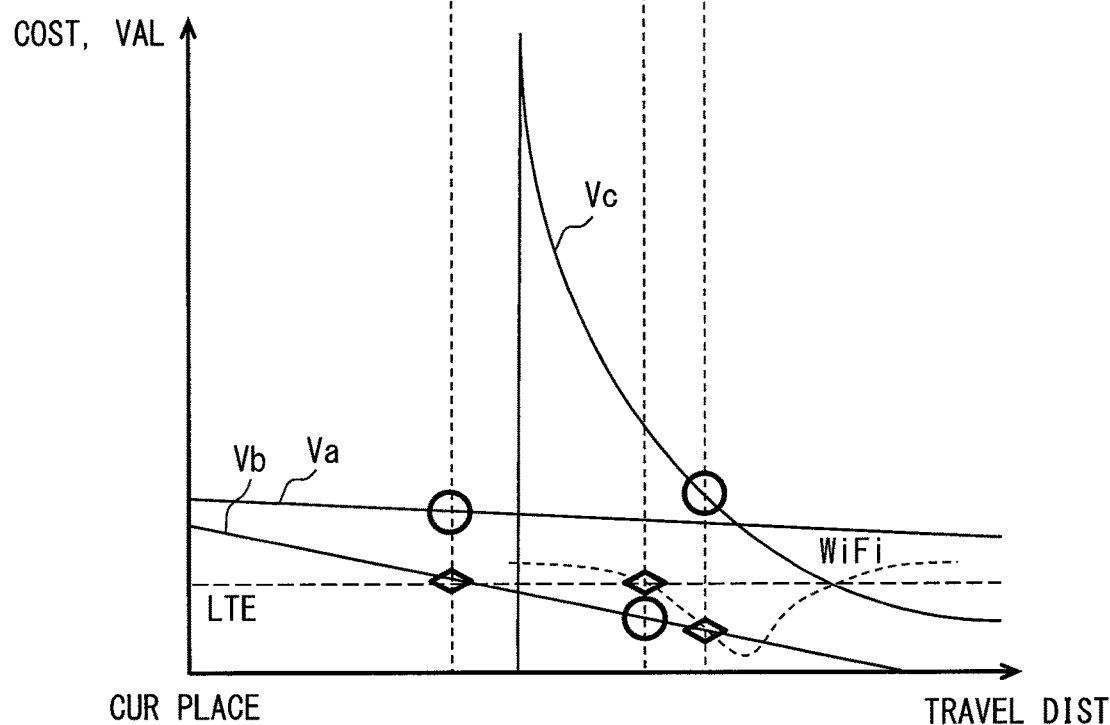

Transfer schedule 1 illustrated in FIGS. 24A to 24B uses an LTE line to transfer data samples such as a biological signal (see field a in FIGS. 24A to 24B) and vehicle control information (see field b in FIGS. 24A to 24B). Contrastingly, WiFi transfers a data sample such as a forward image as a fixed point monitoring video (see field c in FIGS. 24A to 24B). Transfer schedule 1 sequentially transfers data samples from the one corresponding to the largest value at the present point. Specifically, the biological signal information is first targeted at the transfer out of the biological signal information and the vehicle control information.

The prioritizing unit 25 estimates an average transfer band based on the communication resource map and calculates the required transfer time needed to transfer each data sample. The prioritizing unit 25 compares the value of each data sample at the end of the transfer with the utilization cost of the communication resource and can thereby determine whether to transfer each data sample.

According to the above-mentioned comparison process, the value at the end of transferring the biological sensor information is estimated to be higher than the LTE utilization cost. Similarly, the value at the end of transferring the forward image is estimated to be higher than the WiFi utilization cost. The biological sensor information and the forward image as data samples are therefore transferred to the server 10. The value at the end of transferring the vehicle control information is estimated to be lower than the LTE utilization cost. The prioritizing unit 25 can therefore stop transferring the vehicle control information that is expected to be unprofitable.

<Transfer Schedule 2>

Figure 25A:
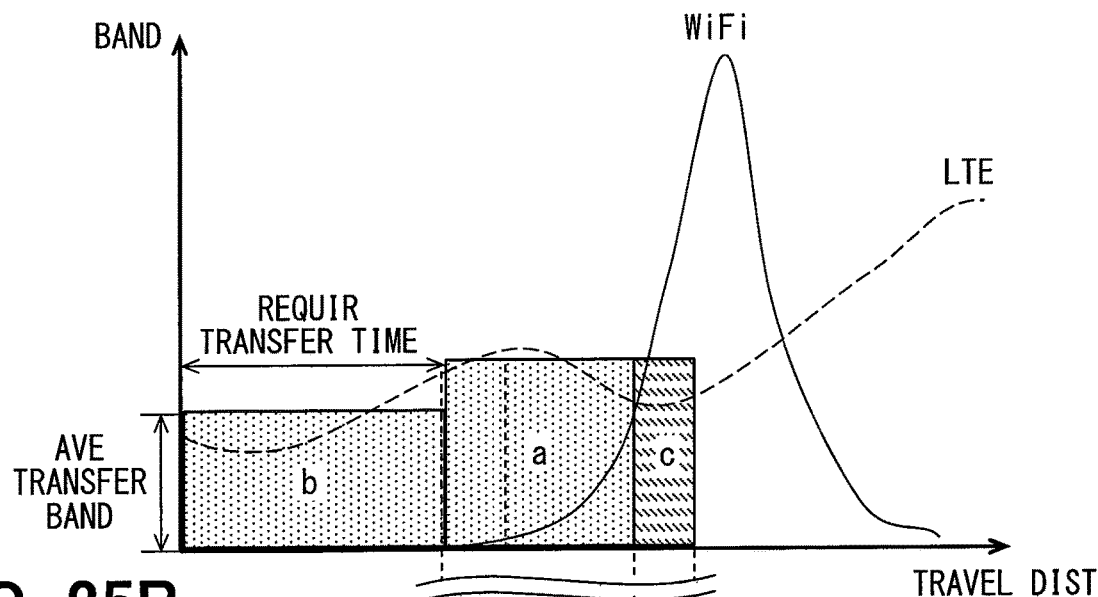
FIGS. 25A to 25B are detailed diagrams illustrating transfer schedule 2 according to the seventh embodiment.
Figure 25B:
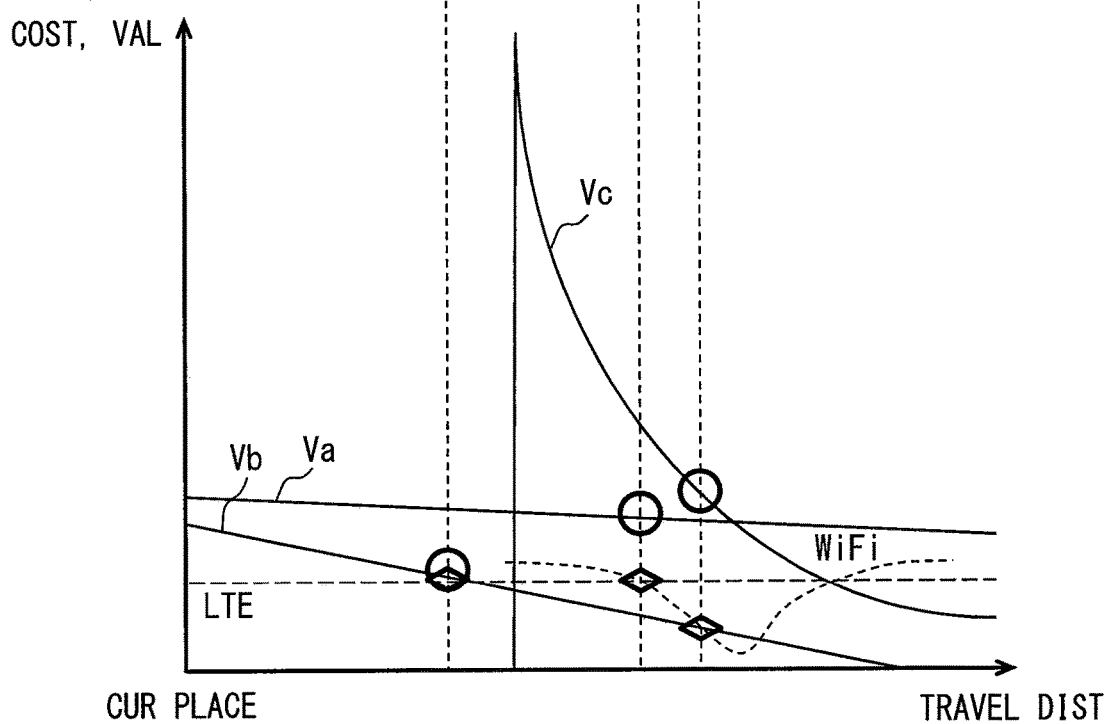

Similarly to transfer schedule 1, transfer schedule 2 illustrated in FIGS. 25A to 25B uses an LTE line to transfer data samples of the biological signal (see field a in FIGS. 25A to 25B) and the vehicle control information (see field b in FIGS. 25A to 25B). WiFi transfers data samples of the forward image (see field c in FIGS. 25A to 25B). Transfer schedule 2 transfers the vehicle control information prior to the biological sensor signal. The biological sensor information loses the value less easily than the vehicle control information. The prioritizing unit 25 preferentially transfers a presently lowly valued data sample and thereby increases the total transfer value.

<Transfer Schedule 3>

Figure 26A:
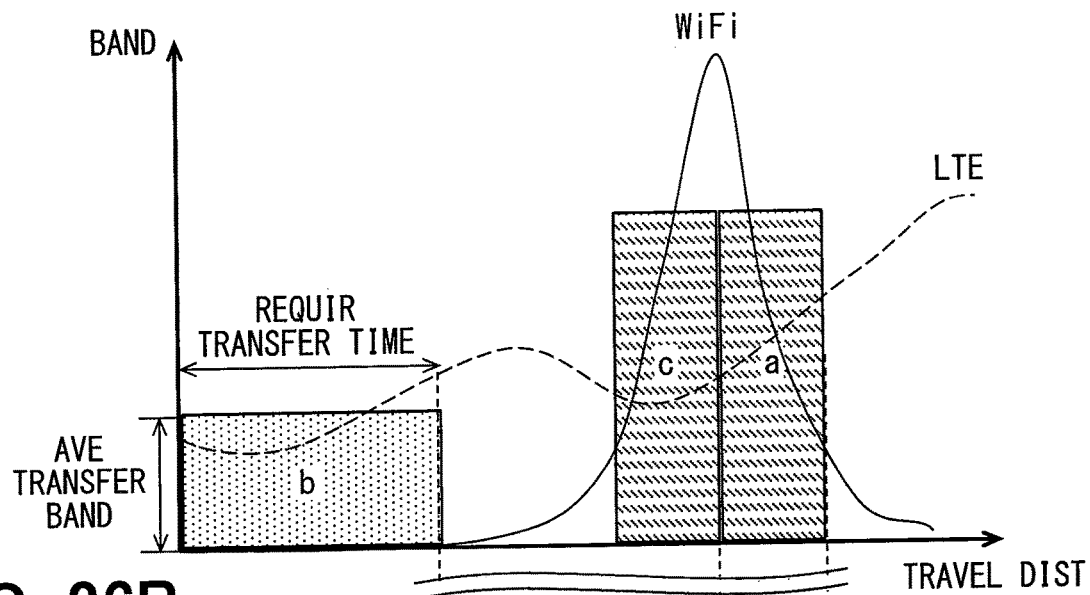
FIGS. 26A to 26B are detailed diagrams illustrating transfer schedule 3 according to the seventh embodiment.
Figure 26B:
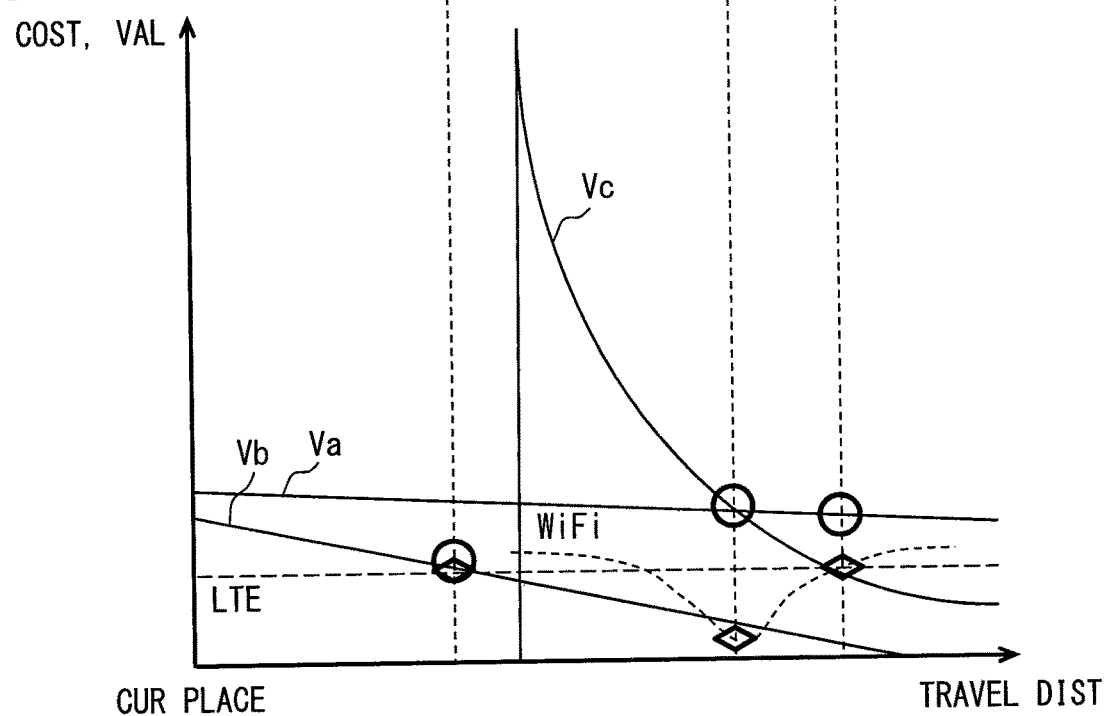

Transfer schedule 3 illustrated in FIGS. 26A to 26B awaits transfer of a transmissible data sample in consideration of the communication resource available in the future and a generated data value. Specifically, LTE rapidly transmits the vehicle control information (field b in FIGS. 26A to 26B) whose sample value remarkably decreases. Contrastingly, the biological sensor information whose sample value hardly decreases is not transferred until WiFi becomes available. WiFi transfers the biological sensor information (see field a in FIGS. 26A to 26B) after transfer of the forward image (see field c in FIGS. 26A to 26B) whose sample value is high. It is therefore possible to minimize utilization costs of the communication resource needed to transfer data.

<Transfer Schedule 4>

Figure 27A:
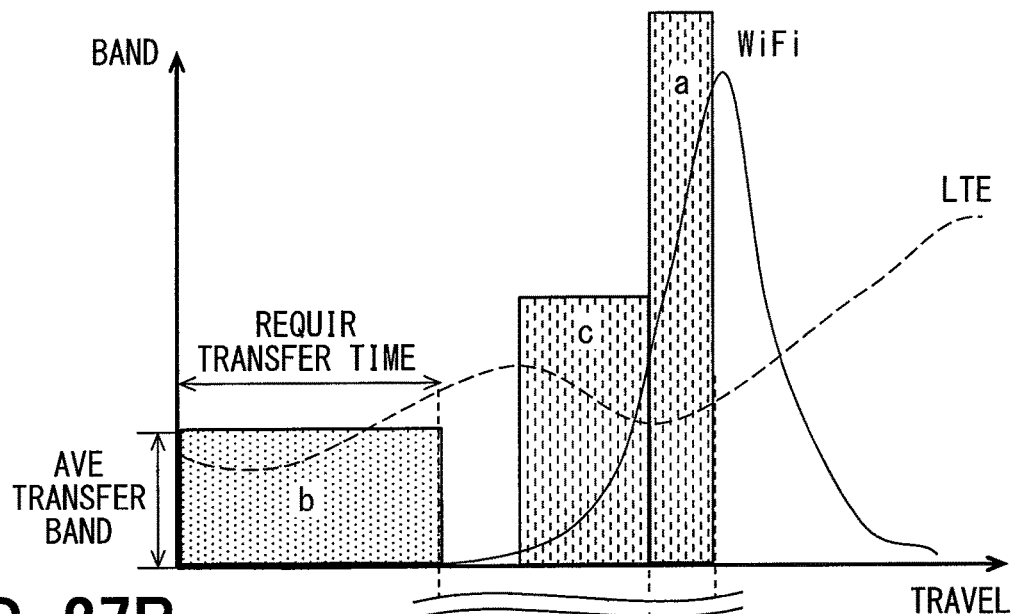
FIGS. 27A to 27B are detailed diagrams illustrating transfer schedule 4 according to the seventh embodiment.
Figure 27B:
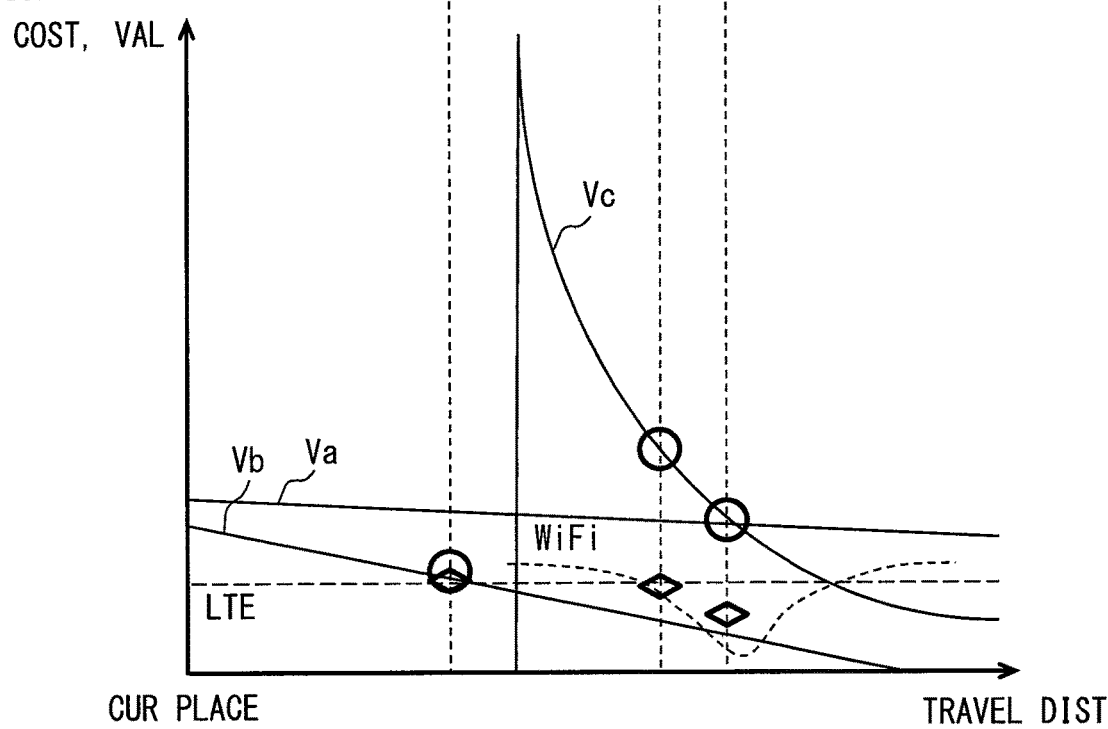

Similarly to transfer schedule 3, transfer schedule 4 illustrated in FIGS. 27A to 27B awaits transfer of a transmissible data sample until WiFi becomes available. As a result, the order of transferring data samples equals that of transfer schedule 3 (see FIGS. 26A to 26B). Transfer schedule 4 uses both LTE and WiFi as communication resources to transfer the biological sensor information (see field a in FIGS. 27A to 27B) and the forward image (see field c in FIGS. 27A to 27B) data samples in order to maximize the data sample values. The communication cost needed for transfer equals an average of LTE and WiFi on the assumption that the communication resources evenly disperse communication loads.

As described in transfer schedules 1 through 4, the seventh embodiment can select a data sample to be transferred depending on the current situation and the situation estimation of the communication resources. Moreover, according to the seventh embodiment, the priority of transferring data samples reflects: the communication resource utilization costs such as a cost percentage or the contractual coverage of the communication resource; and the data sample value. It is therefore possible to select only the data sample assumed to be reliably profitable as a transfer target. The mobile terminal 100 can therefore select and transfer only the data sample that can be transferred to generate a profit higher than or equal to a certain level.

In addition, the seventh embodiment settles the communication resource to be used and the transfer order so as to maximize a difference (or a ratio) between the sum of value indexes and the utilization cost upon completion of the transfer in terms of a combination of data samples selected as transfer targets. The optimization to maximize the profit is therefore available by using the profit as an objective function on condition that the profit results from a transfer.

The seventh embodiment can also estimate a position at the time in the future from the scheduled travel of the mobile terminal 100. A transfer schedule can be settled by giving comprehensive consideration to the utilization cost of each communication resource available at each spot on estimated travel pathway TP and the value of a data sample newly acquired until arrival at each spot. The above-mentioned process can further increase the profit resulting from a transfer.

The seventh embodiment always uses a positive value for a threshold value to select a data sample to be transferred so that the transfer causes a profit. However, for example, data used for machine learning makes it difficult to highly accurately estimate a value at data collection. The threshold value to select a data sample to be transferred may be therefore set to zero or a negative value in order to reduce the risk of unsuccessfully collecting data that may be highly valuable due to a value variation after the data collection. This setting can collect a data sample whose value index per data quantity is lower than the utilization cost, namely, a data sample causing a loss at a certain level or lower.

Eighth Embodiment

The usage attribute information according to the eighth embodiment defines an attribute type other than "application" and its value. Specifically, the usage attribute information according to the eighth embodiment uses "user identification information" as the attribute type. The detailed usage attribute information includes {(user identification information=user 1), (application=street view): attribute A} and {(user identification information=user 2), (application=street view): attribute B}.

Figure 28:
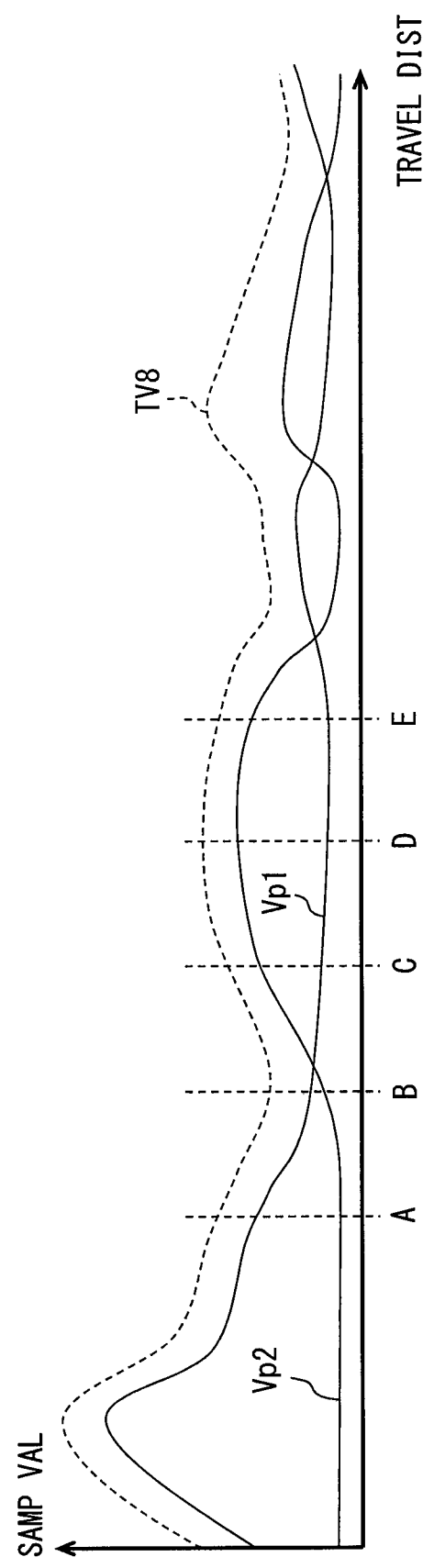
FIG. 28 is a diagram illustrating transition of value indexes for data samples according to an eighth embodiment.

The value of data samples for a user (business operator) increases or decreases depending on whether the data is sufficient even when the same application uses the forward image as a data sample. As illustrated in FIG. 28, transition (solid line Vp1) of the value index corresponding to attribute A differs from transition (solid line Vp2) of the value index corresponding to attribute B. The value indexes are calculated based on the data value maps settled for each user.

A data sample priority is settled based on the sum (broken line TV8) of the value index corresponding to attribute A and the value index corresponding to the attribute B. As a result, the priorities of data samples acquired at spots A through E increase in the order of D>A>E>C>B. The data samples are therefore transferred to the server 10 in the order of D, A, E, C, and B under a communicable condition. The data samples are discarded in the order of B, C, E, A, and D when the storage unit is short of the storage capacity outside a communication area.

The eighth embodiment described so far also provides the same effect as the first embodiment. Moreover, the eighth embodiment can apply different value distributions on a user basis even to the same application. As a result, the priority can be settled based on the sum of values concerning all users who can be expected to use data samples.

Ninth Embodiment

The usage attribute information according to the ninth embodiment uses "user count" as an attribute type. The detailed usage attribute information includes {(application=street view), (user count=2): attribute C} and {(application=SLAM), (user count=1): attribute D}. In this case, an effective value index is calculated as a value index that reflects the user count used for the same usage attribute (application). The effective value index is found by correcting a value index per user corresponding to the user count.

Figure 29:
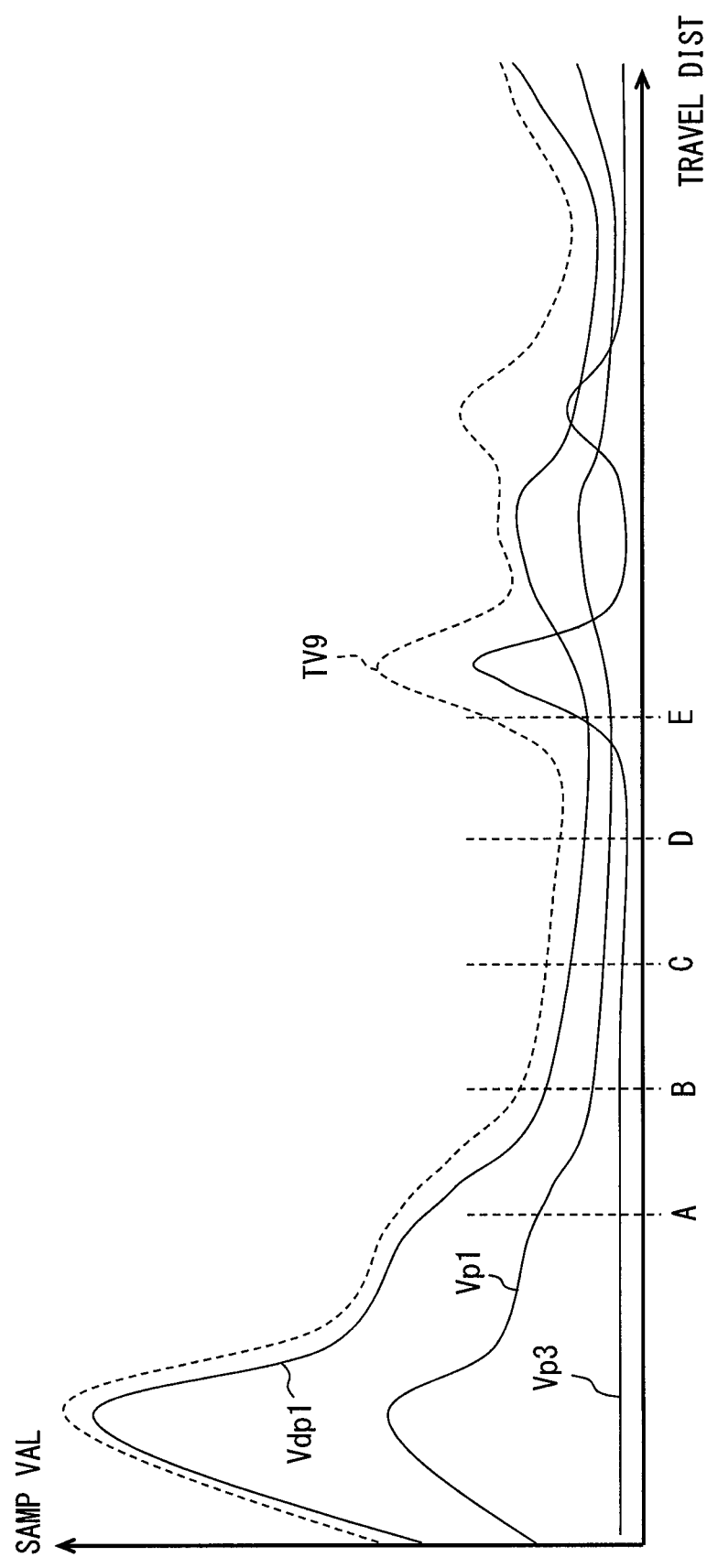
FIG. 29 is a diagram illustrating transition of value indexes for data samples according to a ninth embodiment.

As illustrated in FIG. 29, the prioritizing unit 25 (see FIG. 1) calculates the effective value index (solid line Vdp1) by multiplying the user count and the value index (solid line Vp1) per user that is available as a value index corresponding to attribute C and is calculated based on the data value map. According to the ninth embodiment, the effective value index is found by doubling the value index per user.

The data sample priority is settled based on the sum (broken line TV9) of the effective value index corresponding to the attribute C reflecting the user count and the value index (solid line Vp3) corresponding to the attribute D per user. As a result, the priorities of data samples acquired at spots A through E increase in the order of A>E>B>C>D. The data samples are therefore transferred to the server 10 in the order of A, E, B, C, and D under a communicable condition (see FIG. 1). The data samples are discarded in the order of D, C, B, E, and A when the storage unit is short of the storage capacity outside a communication area.

The ninth embodiment described so far also provides the same effect as the eighth embodiment. Moreover, according to the ninth embodiment, the value index reflects the number of users who use data samples in the same utilization form. According to this technique, the mobile terminal 100 can correctly evaluate the value index for a data sample that increases or decrease depending on the number of users.

A calculation technique to find the effective value index based on the user count is not limited to the technique of multiplying the value index per user and the user count. For example, the value index per user may be multiplied by a square root of the user count. Alternatively, the effective value index may be calculated by a process that defines a table associating the user count with a constant stepwise increasing according to the user count and multiplies the value index per user by the constant based on the table.

Other Embodiments

While there have been described a plurality of embodiments, the present disclosure should not be understood exclusively in terms of the above-mentioned embodiments but may be applicable to various embodiments and combinations within the spirit and scope of the present disclosure.

The above-mentioned embodiments settle the priority of transferring and maintaining data samples based on the sum of value indexes defined for each usage attribute information such as an application. The priority may be defined by a function whose input value is used as each value index for each usage attribute information. The "event detection unit" to detect an event occurrence in the vehicle is not limited to the forward camera, but may be available as various autonomous sensors mounted on the vehicle.

According to a first modification of the embodiment, the state information about the mobile terminal includes the state information about the wireless communication. A large value index is calculated for the forward image as a data sample based on the state information about the wireless communication as the state of communication with the base station degrades. The forward image is used to analyze an obstacle such as a building that degrades the communication state. As above, the prioritizing unit uses the state information about the wireless communication and can thereby appropriately evaluate the value of even the usage attribute information such as an application whose value varies with wireless communication states.

According to a second modification of the embodiment, the state information about the mobile terminal includes the information about an anomaly level of the vehicle behavior. Specifically, a large value index is calculated for the forward image as a data sample when abrupt steering and sudden braking are performed as abnormal actions based on the information about vehicle speeds, acceleration from front to back and from side to side, or operations of a steering wheel and a brake pedal. The forward image is used to analyze a near-miss point. As above, the prioritizing unit uses the information about anomaly levels and can thereby appropriately evaluate the value of even the usage attribute information such as an application whose value varies with anomaly levels of actions.

According to a third modification of the embodiment, similarly to the second modification, the mobile terminal acquires specific actions including abrupt steering and sudden braking as the event occurrence information. As above, the information related to the anomaly level, even if acquired as the event occurrence information, can increase the value index for a data sample before and after the event occurrence.

According to a fourth modification of the embodiment, the event occurrence information includes the detection of data whose degree of similarity to specific reference data is greater than or equal to a certain level. Specifically, the use of a position fingerprint to detect a specific point having been passed or a specific person settles a reference point that allows the value index to be corrected in an increasing direction. It is therefore possible to give the valid value to a data sample corresponding to the usage attribute information such as an application whose value is influenced by detection of data similar to specific data.

A fifth modification of the seventh embodiment references the information about contract with a communication common carrier as the information about communication resources. As a result, the transfer schedule of data samples can be changed to a mode favorable to the contract contents so as to approximate only the highly valued data in a pay-as-you-go plan or the traffic in a flat-rate service to an upper limit, for example.

According to a sixth modification of the seventh embodiment, the information about the communication resource includes information about an available capacity of the communication resource and information about a communication delay during the use of the communication resource. The time to complete the transfer is therefore estimated in consideration of an influence of congestion in the communication resource and an influence of the delay in a low communication load. As a result, it is possible to estimate the value upon completion of the transfer in consideration of delay dependency of the value.

Moreover, it is possible to consider the probability distribution of delay and cost increase due to retransmission if the information about the communication resource includes information about a communication loss during the use of the resource. It is possible to consider a variation probability due to a factor not included in the resource map for available capacities when the information about the communication resource includes the number of terminals using a specific base station for LTE.

As above, the sixth modification settles the mode of using communication resources for a combination of selected data samples to be transferred in consideration of the transfer value, the resource utilization cost, and the probability distribution of these calculated from the communication capacity, the communication delay, and the communication loss.

According to the above-mentioned embodiment, the mobile terminal mounted on the vehicle functions as a data processor. However, the data processing method according to the present disclosure may be embodied by software and hardware or a combination thereof different from the above. For example, the data processing program may be executed by a processing unit other than the vehicle-mounted mobile terminal such as a processing unit in a networked server. The server can calculate the value index and the priority for respective usage attribute information such as an application for data samples based on the information acquired from the vehicle. A non-transitory tangible storage medium such as flash memory or a hard disk drive can be used as a storage unit for the mobile terminal and a storage unit for the server.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A data processor for transferring or maintaining a data sample, the data processor comprising:
    a table management unit that manages a data value table that defines a relationship among (i) a data type of the data sample, (ii) usage attribute information defined by a pair of at least one attribute type and a value, and (iii) information for defining a value index, the table management unit defining the value index of the data sample according to data utilization form, the data utilization form comprising the at least one attribute type and the value; and
    a prioritizing unit that specifies the information for defining the value index with respect to the data sample based on the data value table, and the prioritizing unit defines a priority of the data sample based on the data utilization form in which the data sample is transferred or maintained based on the priority using a communication resource or a storage medium, wherein:
    the data type of the data sample provides at least information whether the data sample is a forward image;
    the at least one attribute type provides information indicating at least one of an application, user identification information, user classification, and a numerical number of users;
    the information for defining the value index includes at least one of a data value map, a value correction map, a data transfer value map, and a communication resource map;
    the value index of the data sample is defined by the data utilization form; and
    the data utilization form is attachable or removable in the data value table such that the priority of the transferring or the maintaining of the data sample can be flexibly changed in response to attaching and removing of the data utilization form in the data value table.

2. The data processor according to claim 1, wherein:
    the attribute type includes an application of the data sample.

3. The data processor according to claim 1, wherein:
    the attribute type includes identification information about a user using the data sample or user classification.

4. The data processor according to claim 1, wherein:
    the prioritizing unit changes the value index defined by the usage attribute information according to a numerical number of users matching the usage attribute information.

5. The data processor according to claim 1, wherein:
    the prioritizing unit determines the priority of the data sample based on a sum of a plurality of value indexes defined by the usage attribute information.

6. The data processor according to claim 1, wherein:
    the data value table includes a data value map defining and associating the value index in one piece of the usage attribute information with state information representing a data processor state; and
    the prioritizing unit derives the value index of the data sample by applying the state information corresponding to acquisition of the data sample to the data value map.

7. The data processor according to claim 6, further comprising:
    a map update unit that updates the data value map, wherein:
    the prioritizing unit derives the value index of the data sample based on a most recent data value map updated by the map update unit.

8. The data processor according to claim 1, wherein:
    the value index defined in the prioritizing unit is a scalar quantity that converts a value of the data sample into a monetary value.

9. The data processor according to claim 1, wherein:
    the table management unit maintains a communication resource map that associates information about a communication resource for transferring the data sample with state information indicating a data processor state; and
    the prioritizing unit selects the communication resource for transferring the data sample as a transfer target according to the communication resource map.

10. The data processor according to claim 1, wherein:
    the prioritizing unit compares the value index per data quantity with a utilization cost of the communication resource per data quantity, the communication resource being usable for transferring the data sample; and
    the prioritizing unit selects the data sample as a transfer target to be transferred using the communication resource when a difference or a ratio between the value index per data quantity and the utilization cost per data quantity in the date sample is equal to or larger than a threshold value.

11. A data processing method for transferring or maintaining a data sample, the data processing method executed by at least one processing unit, and comprising:
    referencing a data value table that defines a relationship among (i) a data type of the data sample, (ii) usage attribute information defined by a pair of at least one attribute type and a value, and (iii) information for defining a value index;
    defining the value index of the data sample according to data utilization form, the data utilization form comprising the at least one attribute type and the value;
    specifying the information for defining the value index with respect to the data sample based on the data value table; and
    defining a priority of the data sample based on the data utilization form in which the data sample is transferred or maintained based on the priority using a communication resource or a storage medium, wherein:
    the data type of the data sample provides at least information whether the data sample is a forward image;
    the at least one attribute type provides information indicating at least one of an application, user identification information, user classification, and a numerical number of users;
    the information for defining the value index includes at least one of a data value map, a value correction map, a data transfer value map, and a communication resource map;
    the value index of the data sample is defined by the data utilization form; and the data utilization form is attachable or removable in the data value table such that the priority of the transferring or the maintaining of the data sample can be flexibly changed in response to attaching and removing of the data utilization form in the data value table.

12. The data processor according to claim 1, wherein:
the value index includes the data value map for a street view application that corresponds to position information and time information as state information about a mobile terminal.

* * * * *